(12) United States Patent
Ross et al.

(10) Patent No.: US 11,643,207 B1
(45) Date of Patent: May 9, 2023

(54) AIRCRAFT FOR TRANSPORTING AND DEPLOYING UAVS

(71) Applicant: Textron Innovations Inc., Providence, RI (US)

(72) Inventors: Brent Chadwick Ross, Flower Mound, TX (US); Steven Ray Ivans, Ponder, TX (US); Jeffrey Paul Nissen, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 17 days.

(21) Appl. No.: 17/544,929

(22) Filed: Dec. 7, 2021

(51) Int. Cl.
| | | |
|---|---|---|
| *B64D 5/00* | (2006.01) | |
| *B64C 39/02* | (2023.01) | |
| *B64C 39/08* | (2006.01) | |
| *B64U 70/20* | (2023.01) | |
| *B64U 80/82* | (2023.01) | |
| *B64C 29/02* | (2006.01) | |
| *B64C 29/00* | (2006.01) | |
| *G05D 1/10* | (2006.01) | |

(52) U.S. Cl.
CPC ............ *B64D 5/00* (2013.01); *B64C 29/0033* (2013.01); *B64C 39/024* (2013.01); *B64C 39/08* (2013.01); *G05D 1/102* (2013.01); *G05D 1/104* (2013.01); *B64U 70/20* (2023.01); *B64U 80/82* (2023.01)

(58) Field of Classification Search
CPC .......... B64D 5/00; B64U 70/20; B64U 80/82; B64C 29/02; B64C 39/08
See application file for complete search history.

(56) References Cited

U.S. PATENT DOCUMENTS

| 1,655,113 A | 1/1928 | Nikola |
|---|---|---|
| 2,601,090 A | 6/1952 | James |
| 2,655,997 A | 10/1953 | Peterson |
| (Continued) | | |

FOREIGN PATENT DOCUMENTS

| CN | 105539833 A | 5/2016 |
|---|---|---|
| FR | 2977865 A3 | 1/2013 |
| (Continued) | | |

OTHER PUBLICATIONS

Air Launched Unmanned Disaster Relief Delivery Vehicle, 33rd Annual AHS Student Design Competition, University of Maryland, Undated but admitted prior art.

(Continued)

*Primary Examiner* — Michael H Wang
*Assistant Examiner* — Colin Zohoori
(74) *Attorney, Agent, or Firm* — Lawrence Youst PLLC

(57) ABSTRACT

An aircraft operable to transition between thrust-borne lift in a VTOL orientation and wing-borne lift in a biplane orientation. The aircraft has an airframe including first and second wings with first and second pylons coupled therebetween. A distributed thrust array is coupled to the airframe including a plurality of propulsion assemblies coupled to the first wing and a plurality of propulsion assemblies coupled to the second wing. A UAV carrier assembly is coupled between the first and second pylons. The UAV carrier assembly has a plurality of UAV stations each configured to selectively transport and release a UAV. A flight control system is configured to control each of the propulsion assemblies and launch each of the UAVs during flight.

15 Claims, 18 Drawing Sheets

(56) References Cited

U.S. PATENT DOCUMENTS

| | | |
|---|---|---|
| 2,688,843 A | 9/1954 | Pitt |
| 3,002,712 A | 10/1961 | Sterling |
| 3,081,964 A | 3/1963 | Quenzler |
| 3,181,810 A | 5/1965 | Olson |
| 3,259,343 A | 7/1966 | Roppel |
| 3,289,980 A | 12/1966 | Gardner |
| 3,350,035 A | 10/1967 | Schlieben |
| 3,592,412 A | 7/1971 | Glatfelter |
| 3,618,875 A | 11/1971 | Kappus |
| 3,783,618 A | 1/1974 | Kawamura |
| 3,916,588 A | 11/1975 | Magill |
| 4,243,358 A | 1/1981 | Carlock et al. |
| 4,458,864 A | 7/1984 | Colombo et al. |
| 4,571,157 A | 2/1986 | Eickmann |
| 4,596,368 A | 6/1986 | Schmittle |
| 4,613,098 A | 9/1986 | Eickmann |
| 4,741,672 A | 5/1988 | Breuner |
| 4,771,967 A | 9/1988 | Geldbaugh |
| 4,913,377 A | 4/1990 | Eickmann |
| 4,925,131 A | 5/1990 | Eickmann |
| 5,131,605 A | 7/1992 | Kress |
| 5,188,512 A | 2/1993 | Thornton |
| 5,592,894 A | 1/1997 | Johnson |
| 5,842,667 A | 12/1998 | Jones |
| 6,086,015 A | 7/2000 | MacCready |
| 6,170,778 B1 | 1/2001 | Cycon et al. |
| 6,260,793 B1 | 7/2001 | Balayn et al. |
| 6,270,038 B1 | 8/2001 | Cycon et al. |
| 6,402,088 B1 | 6/2002 | Syrovy et al. |
| 6,655,631 B2 | 12/2003 | Austen-Brown |
| 6,845,939 B1 | 1/2005 | Baldwin |
| 6,886,776 B2 | 5/2005 | Wagner et al. |
| 6,892,980 B2 | 5/2005 | Kawai |
| 7,059,562 B2 | 6/2006 | Baldwin |
| 7,150,429 B2 | 12/2006 | Kusic |
| 7,210,654 B1 | 5/2007 | Cox et al. |
| 7,465,236 B2 | 12/2008 | Wagels |
| 7,472,863 B2 | 1/2009 | Pak |
| 7,555,893 B2 | 7/2009 | Okai et al. |
| 7,984,684 B2 | 7/2011 | Hinderks |
| 8,152,096 B2 | 4/2012 | Smith |
| 8,393,564 B2 | 3/2013 | Kroo |
| 8,505,846 B1 | 8/2013 | Sanders |
| 8,602,348 B2 | 12/2013 | Bryant |
| 8,646,720 B2 | 2/2014 | Shaw |
| 8,733,690 B2 | 5/2014 | Bevirt et al. |
| 8,800,912 B2 | 8/2014 | Oliver |
| 8,820,672 B2 | 9/2014 | Erben et al. |
| 8,833,692 B2 | 9/2014 | Yoeli |
| 8,909,391 B1 | 12/2014 | Peeters et al. |
| 8,948,935 B1 | 2/2015 | Peeters et al. |
| 9,022,312 B2 | 5/2015 | Kosheleff |
| 9,045,226 B2 | 6/2015 | Piasecki et al. |
| 9,087,451 B1 | 7/2015 | Jarrell |
| 9,108,744 B2 | 8/2015 | Takeuchi |
| 9,109,575 B2 | 8/2015 | Weddendorf et al. |
| 9,120,560 B1 | 9/2015 | Armer et al. |
| 9,127,908 B2 | 9/2015 | Miralles |
| 9,162,753 B1 | 10/2015 | Panto et al. |
| 9,187,174 B2 | 11/2015 | Shaw |
| 9,193,460 B2 | 11/2015 | Laudrain |
| 9,221,538 B2 | 12/2015 | Takahashi et al. |
| 9,242,714 B2 | 1/2016 | Wang et al. |
| 9,254,916 B2 | 2/2016 | Yang |
| 9,284,049 B1 | 3/2016 | Wang et al. |
| 9,321,530 B2 | 4/2016 | Wang et al. |
| 9,376,208 B1 | 6/2016 | Gentry |
| 9,388,794 B2 | 7/2016 | Weddendorf et al. |
| 9,403,593 B2 | 8/2016 | Downey et al. |
| 9,440,736 B2 | 9/2016 | Bitar |
| 9,463,875 B2 | 10/2016 | Abuelsaad et al. |
| 9,493,225 B2 | 11/2016 | Wang et al. |
| 9,610,817 B1 | 4/2017 | Piasecki et al. |
| 9,643,720 B2 | 5/2017 | Hesselbarth |
| 9,694,908 B2 | 7/2017 | Razroev |
| 9,694,911 B2 | 7/2017 | Bevirt et al. |
| 9,714,087 B2 | 7/2017 | Matsuda |
| 9,798,322 B2 | 10/2017 | Bachrach et al. |
| 9,800,091 B2 | 10/2017 | Nugent, Jr. et al. |
| 9,821,909 B2 | 11/2017 | Moshe |
| 9,963,228 B2 | 5/2018 | McCullough et al. |
| 9,994,313 B2 | 6/2018 | Claridge et al. |
| 10,011,351 B2 | 7/2018 | McCullough et al. |
| 10,124,890 B2 | 11/2018 | Sada-Salinas et al. |
| 10,183,746 B2 | 1/2019 | McCullough et al. |
| 10,214,285 B2 | 2/2019 | McCullough et al. |
| 10,220,944 B2 | 3/2019 | McCullough et al. |
| 10,227,133 B2 | 3/2019 | McCullough et al. |
| 10,232,950 B2 | 3/2019 | McCullough et al. |
| 10,301,016 B1 | 5/2019 | Bondarev et al. |
| 10,315,761 B2 | 6/2019 | McCullough et al. |
| 10,322,799 B2 | 6/2019 | McCullough et al. |
| 10,329,014 B2 | 6/2019 | McCullough et al. |
| 10,343,773 B1 | 7/2019 | McCullough et al. |
| 10,351,232 B2 | 7/2019 | McCullough et al. |
| 10,442,522 B2 | 10/2019 | Oldroyd et al. |
| 10,457,390 B2 | 10/2019 | McCullough et al. |
| 10,501,193 B2 | 12/2019 | Oldroyd et al. |
| 10,583,921 B1 | 3/2020 | McCullough et al. |
| 10,597,164 B2 | 3/2020 | Oldroyd et al. |
| 10,604,249 B2 | 3/2020 | McCullough et al. |
| 10,611,477 B1 | 4/2020 | McCullough et al. |
| 10,618,646 B2 | 4/2020 | McCullough et al. |
| 10,618,647 B2 | 4/2020 | McCullough et al. |
| 10,625,853 B2 | 4/2020 | McCullough et al. |
| 10,633,087 B2 | 4/2020 | McCullough et al. |
| 10,633,088 B2 | 4/2020 | McCullough et al. |
| 10,661,892 B2 | 5/2020 | McCullough et al. |
| 10,737,765 B2 | 8/2020 | Oldroyd et al. |
| 10,737,778 B2 | 8/2020 | Oldroyd et al. |
| 10,752,350 B2 | 8/2020 | McCullough et al. |
| 10,870,487 B2 | 12/2020 | McCullough et al. |
| 10,913,541 B2 | 2/2021 | Oldroyd et al. |
| 10,981,661 B2 | 4/2021 | Oldroyd et al. |
| 11,027,837 B2 | 6/2021 | McCullough et al. |
| 11,084,579 B2 | 8/2021 | Ivans et al. |
| 11,091,257 B2 | 8/2021 | McCullough et al. |
| 11,104,446 B2 | 8/2021 | McCullough et al. |
| 11,111,010 B2 * | 9/2021 | Bernard ............... B64C 39/12 |
| 11,319,064 B1 * | 5/2022 | Wittmaak, Jr. ......... B64D 1/10 |
| 2002/0100834 A1 | 8/2002 | Baldwin |
| 2002/0100835 A1 | 8/2002 | Kusic |
| 2003/0062443 A1 | 4/2003 | Wagner et al. |
| 2004/0245374 A1 | 12/2004 | Morgan |
| 2006/0091258 A1 | 5/2006 | Chiu et al. |
| 2006/0266881 A1 | 11/2006 | Hughey |
| 2007/0212224 A1 | 9/2007 | Podgurski |
| 2007/0221780 A1 | 9/2007 | Builta |
| 2009/0008499 A1 | 1/2009 | Shaw |
| 2010/0147993 A1 | 6/2010 | Annati et al. |
| 2010/0193644 A1 | 8/2010 | Karem |
| 2010/0295321 A1 | 11/2010 | Bevirt |
| 2011/0001001 A1 | 1/2011 | Bryant |
| 2011/0042508 A1 | 2/2011 | Bevirt |
| 2011/0042509 A1 | 2/2011 | Bevirt et al. |
| 2011/0057453 A1 | 3/2011 | Roberts |
| 2011/0121570 A1 | 5/2011 | Bevirt et al. |
| 2011/0315806 A1 | 12/2011 | Piasecki et al. |
| 2012/0209456 A1 | 8/2012 | Harmon et al. |
| 2012/0234968 A1 | 9/2012 | Smith |
| 2013/0020429 A1 | 1/2013 | Kroo |
| 2013/0175404 A1 | 7/2013 | Shefer |
| 2013/0341458 A1 | 12/2013 | Sutton et al. |
| 2014/0018979 A1 | 1/2014 | Goossen et al. |
| 2014/0097290 A1 | 4/2014 | Leng |
| 2014/0339372 A1 | 11/2014 | Dekel et al. |
| 2015/0012154 A1 | 1/2015 | Senkel et al. |
| 2015/0014475 A1 | 1/2015 | Taylor et al. |
| 2015/0136897 A1 | 5/2015 | Seibel et al. |
| 2015/0284079 A1 | 10/2015 | Matsuda |
| 2015/0285165 A1 | 10/2015 | Steinwandel et al. |
| 2016/0068265 A1 | 3/2016 | Hoareau et al. |
| 2016/0180717 A1 | 6/2016 | Ubhi et al. |
| 2016/0214712 A1 | 7/2016 | Fisher et al. |

(56) References Cited

U.S. PATENT DOCUMENTS

| | | |
|---|---|---|
| 2017/0008627 A1 | 1/2017 | Soto et al. |
| 2017/0021924 A1 | 1/2017 | Kubik et al. |
| 2017/0066531 A1 | 3/2017 | McAdoo |
| 2017/0097644 A1 | 4/2017 | Fegely et al. |
| 2017/0144746 A1 | 5/2017 | Schank et al. |
| 2017/0158312 A1 | 6/2017 | Alber et al. |
| 2017/0174342 A1 | 6/2017 | Huang |
| 2017/0240274 A1 | 8/2017 | Regev |
| 2017/0297699 A1 | 10/2017 | Alber et al. |
| 2017/0327219 A1 | 11/2017 | Alber |
| 2017/0334557 A1 | 11/2017 | Alber et al. |
| 2018/0002011 A1 | 1/2018 | McCullough et al. |
| 2018/0002012 A1 | 1/2018 | McCullough et al. |
| 2018/0002013 A1 | 1/2018 | McCullough et al. |
| 2018/0002014 A1 | 1/2018 | McCullough et al. |
| 2018/0002015 A1 | 1/2018 | McCullough et al. |
| 2018/0002016 A1 | 1/2018 | McCullough et al. |
| 2018/0002026 A1 | 1/2018 | Oldroyd et al. |
| 2018/0002027 A1 | 1/2018 | McCullough et al. |
| 2018/0022467 A1 | 1/2018 | Alber |
| 2018/0044011 A1 | 2/2018 | Reichert |
| 2018/0118336 A1* | 5/2018 | Drennan ................ B64C 37/02 |
| 2018/0244377 A1 | 8/2018 | Chan |
| 2018/0244383 A1 | 8/2018 | Valente et al. |
| 2018/0257761 A1 | 9/2018 | Oldroyd et al. |
| 2018/0265193 A1 | 9/2018 | Gibboney et al. |
| 2018/0273160 A1 | 9/2018 | Baldwin et al. |
| 2018/0327092 A1 | 11/2018 | Deng et al. |
| 2018/0362158 A1 | 12/2018 | Zhang et al. |
| 2019/0031331 A1 | 1/2019 | McCullough et al. |
| 2019/0031334 A1 | 1/2019 | McCullough et al. |
| 2019/0031335 A1 | 1/2019 | McCullough et al. |
| 2019/0031336 A1 | 1/2019 | McCullough et al. |
| 2019/0031337 A1 | 1/2019 | McCullough et al. |
| 2019/0031338 A1 | 1/2019 | McCullough et al. |
| 2019/0031339 A1 | 1/2019 | McCullough et al. |
| 2019/0031361 A1 | 1/2019 | McCullough et al. |
| 2019/0144108 A1 | 5/2019 | McCullough et al. |
| 2019/0263516 A1 | 8/2019 | McCullough et al. |
| 2019/0389573 A1 | 12/2019 | Kahou et al. |

FOREIGN PATENT DOCUMENTS

| | | |
|---|---|---|
| GB | 587388 A | 4/1947 |
| GB | 618475 A | 2/1949 |
| GB | 654089 A | 6/1951 |
| WO | 2001074659 A1 | 10/2001 |
| WO | 2005039973 A2 | 5/2005 |
| WO | 2014067563 A1 | 5/2014 |

OTHER PUBLICATIONS

Bell and NASA Partner for UAV Development; Transportup.com; Sep. 9, 2018.
Bell APT—Automatic Pod Transport; SUASNEWS.com; Dec. 6, 2017.
Bell Autonomous Pod Transport; MONCH.com; May 2, 2018.
Duffy, et al., The LIFT! Project—Modular, Electric Vertical Lift System with Ground Power Tether, AHS 71st Annual Forum, Virginia Beach, Virginia, May 2015.
Kang, et al., Gap and Stagger Effects on Biplanes with End Plates, 47th AIAA Aerospace Sciences Meeting Including The New Horizons Forum and Aerospace Exposition, Orlando, Florida, Jan. 2009.
Munk, General Biplane Theory, National Advisory Committee for Aeronautics, Unknown Date.
Wolfe, Frank; Bell Moving to Scale Up Antonymous Delivery Drones for US Military; Rotor & Wing International; Sep. 27, 2018.

\* cited by examiner

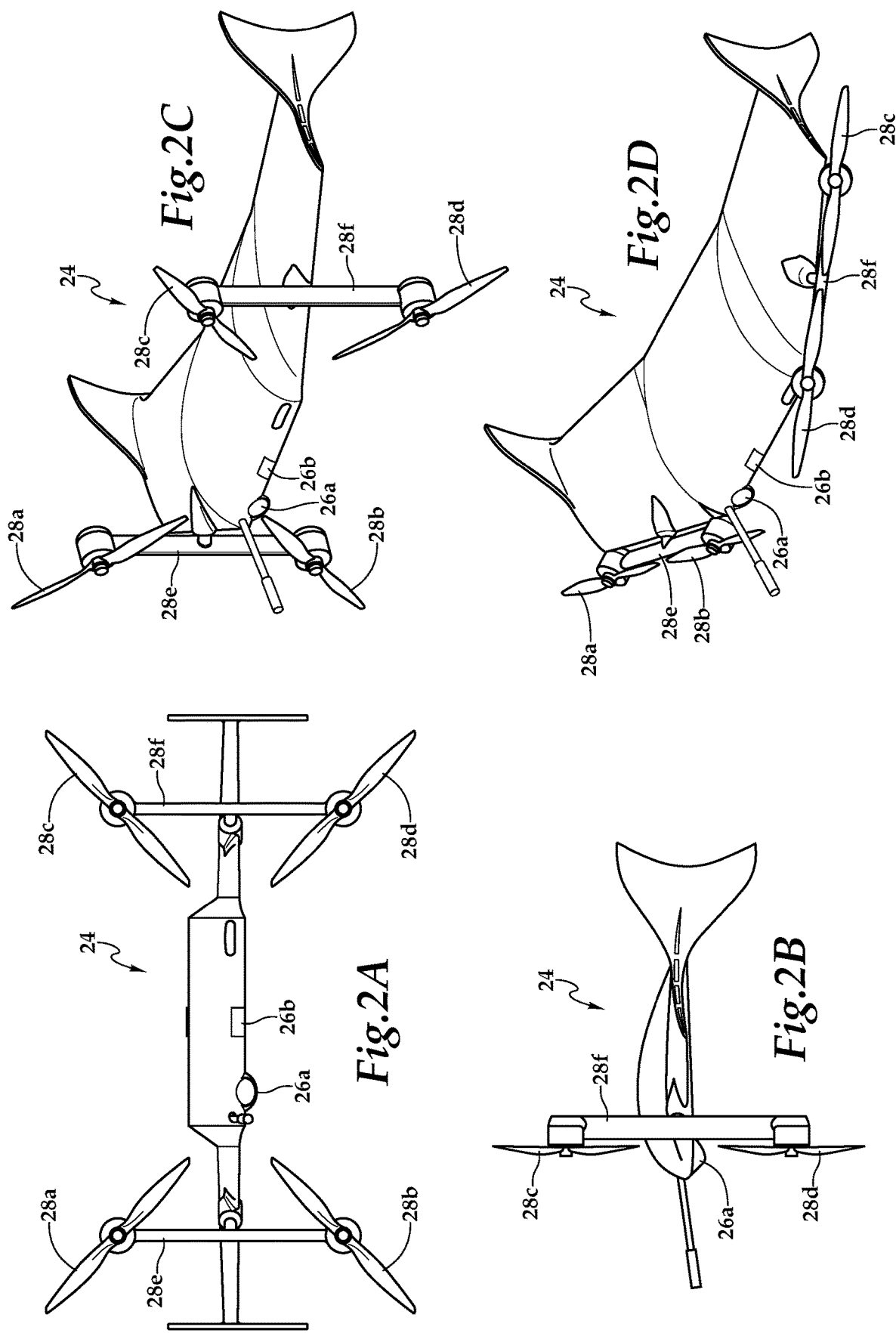

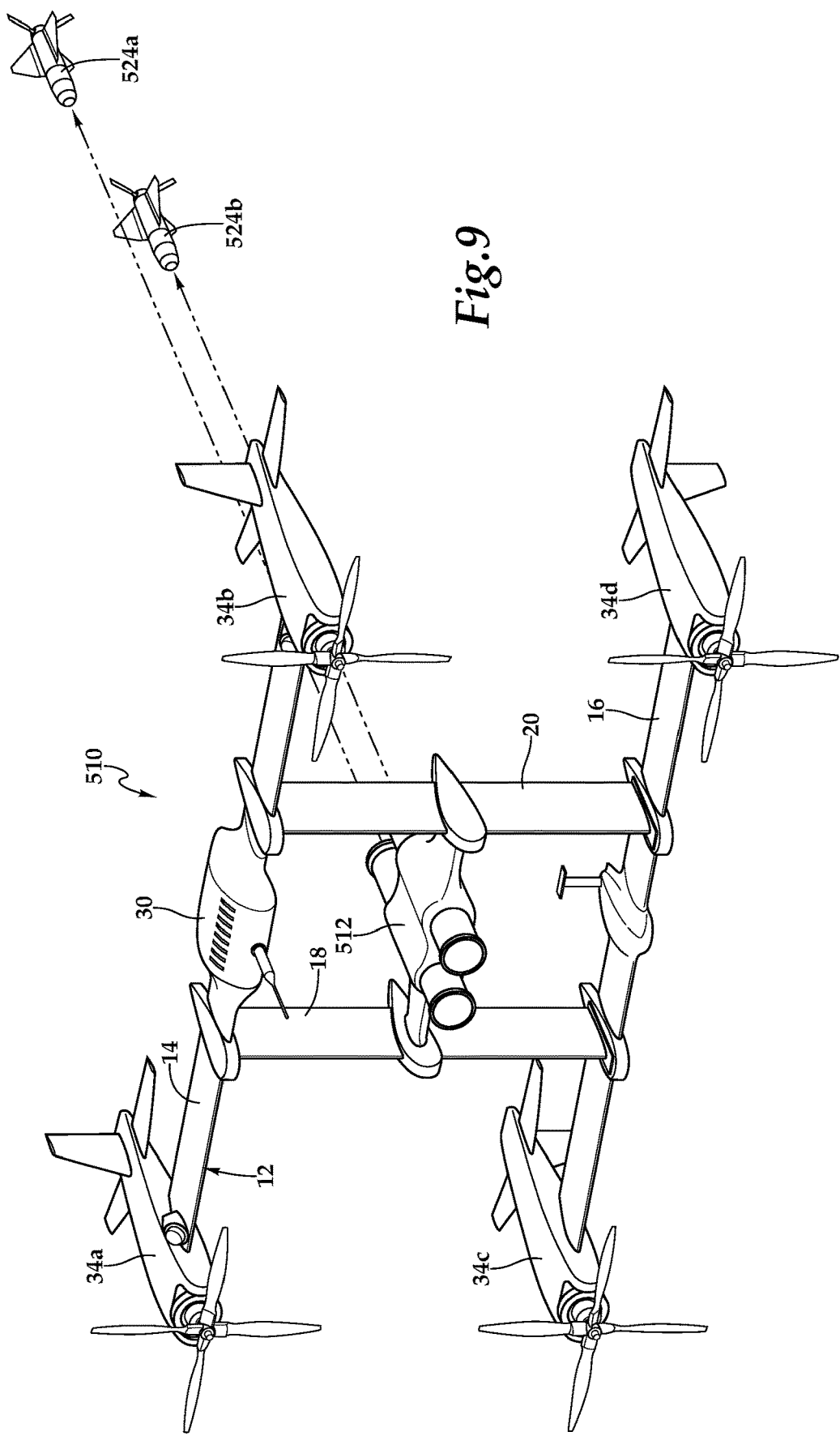

AIRCRAFT FOR TRANSPORTING AND DEPLOYING UAVS

TECHNICAL FIELD OF THE DISCLOSURE

The present disclosure relates, in general, to aircraft configured to convert between thrust-borne lift in a VTOL orientation and wing-borne lift in a biplane orientation and, in particular, to aircraft configured to transport and deploy one or more unmanned aircraft vehicles to extend the range of such unmanned aircraft vehicles.

BACKGROUND

Unmanned aerial vehicles (UAVs), also known as unmanned aerial systems (UASs) or drones, are self-powered aircraft that do not carry a human operator, uses aerodynamic forces to provide vehicle lift, are autonomously and/or remotely operated, may be expendable or recoverable and may carry lethal or nonlethal payloads. UAVs are commonly used in military, commercial, scientific, recreational and other applications. For example, military applications include intelligence, surveillance, reconnaissance and attack missions. Civil applications include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few. Certain UAVs have been networked together such that they are capable of cooperating with one another and exhibiting swarm behavior. Such swarm UAVs have the ability to dynamically adapt responsive to changing conditions or parameters including the ability for group coordination, distributed control, distributed tactical group planning, distributed tactical group goals, distributed strategic group goals and/or fully autonomous swarming. It has been found, however, that due to the size of certain UAVs, their flight range is limited. Accordingly, a need has arisen for transportation and deployment systems that can extend the range of such UAVs.

SUMMARY

In a first aspect, the present disclosure is directed to an aircraft operable to transition between thrust-borne lift in a VTOL orientation and wing-borne lift in a biplane orientation. The aircraft has an airframe including first and second wings with first and second pylons coupled therebetween. A distributed thrust array is coupled to the airframe including a plurality of propulsion assemblies coupled to the first wing and a plurality of propulsion assemblies coupled to the second wing. A UAV carrier assembly is coupled between the first and second pylons. The UAV carrier assembly has a plurality of UAV stations each configured to selectively transport and release a UAV. A flight control system is configured to control each of the propulsion assemblies and launch each of the UAVs during flight.

In certain embodiments, the plurality of UAV stations may be vertically stacked when the aircraft is in the biplane orientation. In some embodiments, the plurality of UAV stations may be at least two UAV stations, at least three UAV stations, at least six UAV stations or more. In certain embodiments, each of the UAV stations is configured to provide a mechanical coupling with a respective one of the UAVs, a magnetic coupling with a respective one of the UAVs, an electrical coupling with a respective one of the UAVs, a power communication coupling with a respective one of the UAVs and/or a data communication coupling with a respective one of the UAVs. In some embodiments, the flight control system may be configured to sequentially launch each of the UAVs. In other embodiments, the flight control system may be configured to simultaneously launch each of the UAVs.

In certain embodiments, the flight control system may be configured to launch each of the UAVs when the aircraft is in the biplane orientation. In other embodiments, the flight control system may be configured to launch each of the UAVs when the aircraft is in the VTOL orientation. In some embodiments, each of the UAVs may be released aftward from the aircraft. In other embodiments, each of the UAVs may be released forward from the aircraft. In certain embodiments, the UAV carrier assembly may include a substantially horizontal cross member coupled between the first and second pylons, a first beam extending substantially vertically upward from the cross member and a second beam extending substantially vertically downward from the cross member when the aircraft is in the biplane orientation. In such embodiments, the first and second beams may be aft swept beams. In some embodiments, the UAV carrier assembly may be a tube launcher. In certain embodiments, the UAV carrier assembly may be configured for UAV recovery during flight.

In a second aspect, the present disclosure is directed to an aircraft operable to transition between thrust-borne lift in a VTOL orientation and wing-borne lift in a biplane orientation. The aircraft has an airframe including first and second wings with first and second pylons coupled therebetween. A distributed thrust array is coupled to the airframe including a plurality of propulsion assemblies coupled to the first wing and a plurality of propulsion assemblies coupled to the second wing. A UAV carrier assembly is coupled between the first and second pylons. The UAV carrier assembly has a plurality of UAV stations each configured to selectively transport and release a UAV. A flight control system is configured to control each of the propulsion assemblies and launch each of the UAVs during flight. In addition, the flight control system is configured to sequentially launch each of the UAVs when the aircraft is in the biplane orientation with each of the UAVs released aftward from the aircraft.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2D are schematic illustrations of an exemplary UAV operable for use with the aircraft of FIGS. 1A-1G;

FIG. 9 is a schematic illustration of an aircraft for transporting and deploying UAVs that is operable to convert between thrust-borne lift in a VTOL orientation and wing-borne lift in a biplane orientation in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
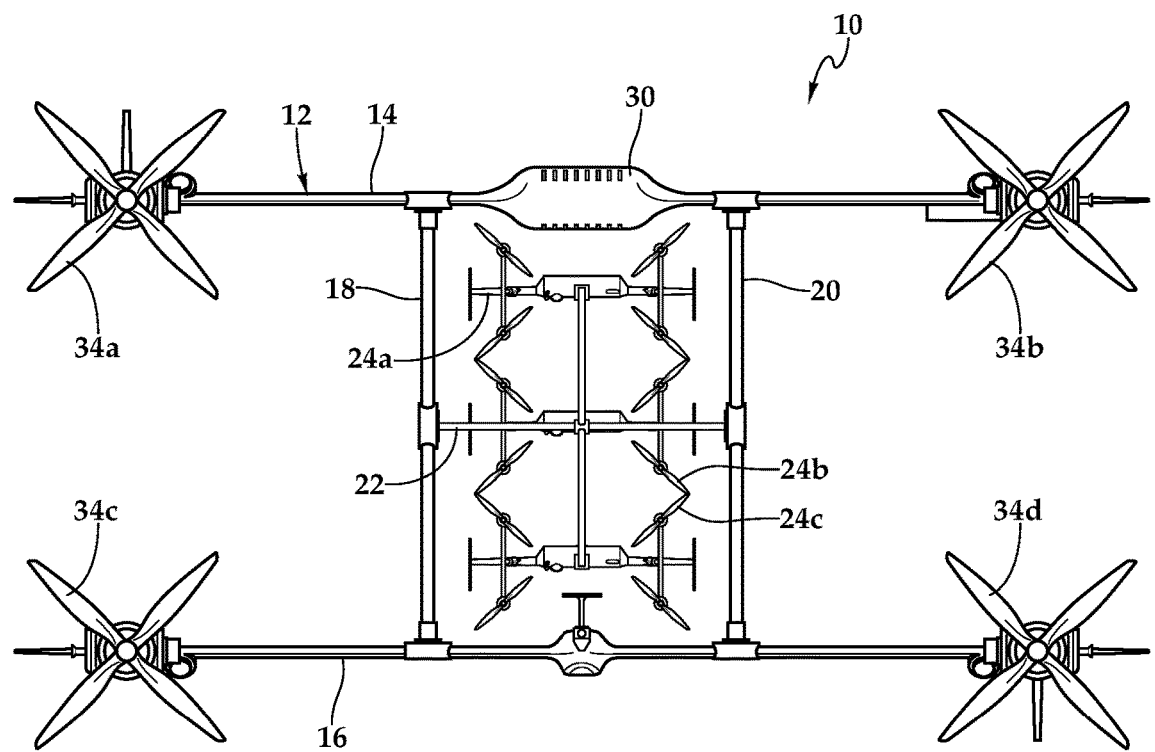
FIGS. 1A-1G are schematic illustrations of an aircraft for transporting and deploying UAVs that is operable to convert between thrust-borne lift in a VTOL orientation and wing-borne lift in a biplane orientation in accordance with embodiments of the present disclosure.
Figure 1A:
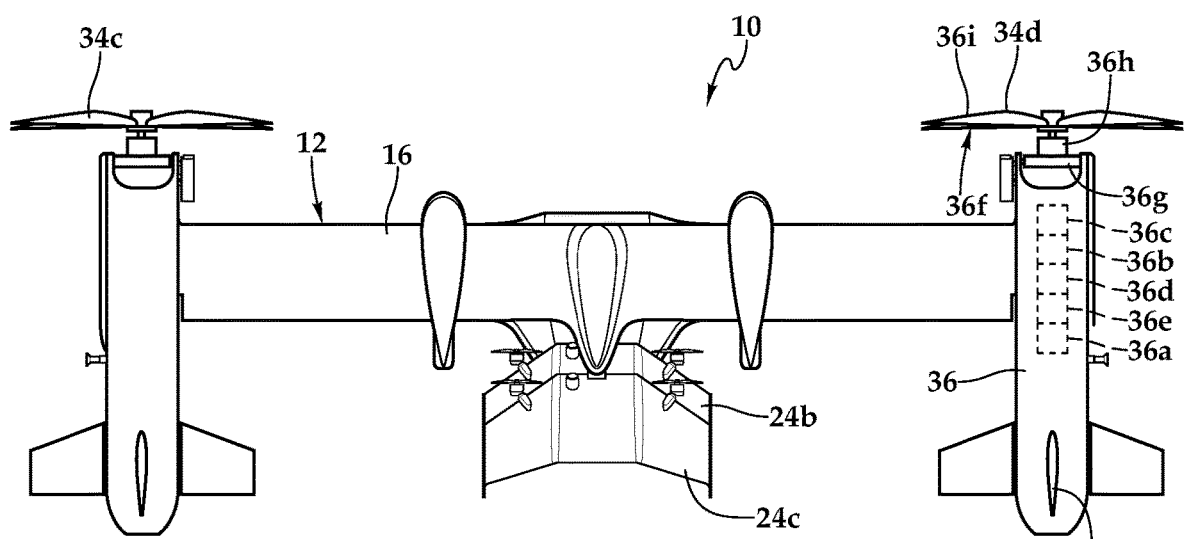
Figure 1D:
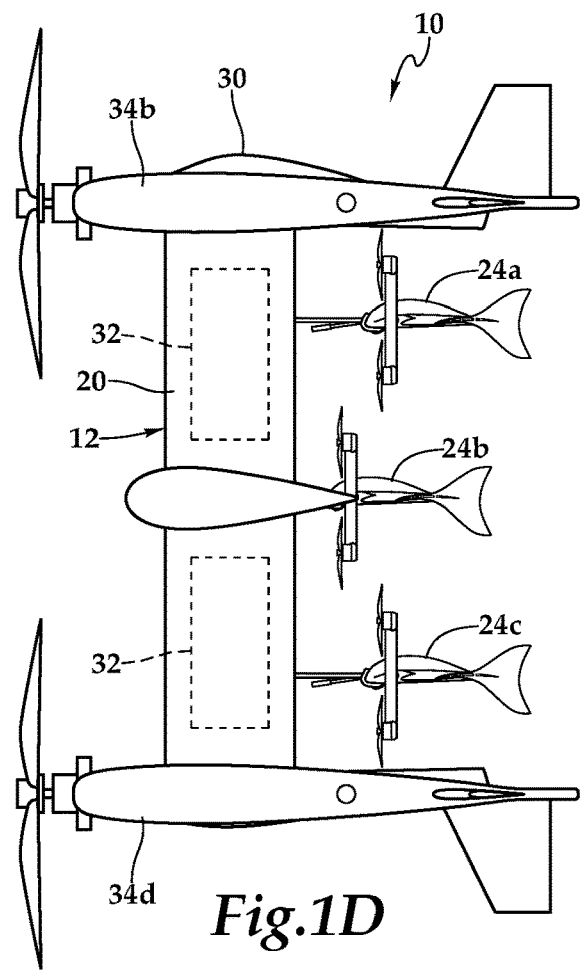
Figure 1C:
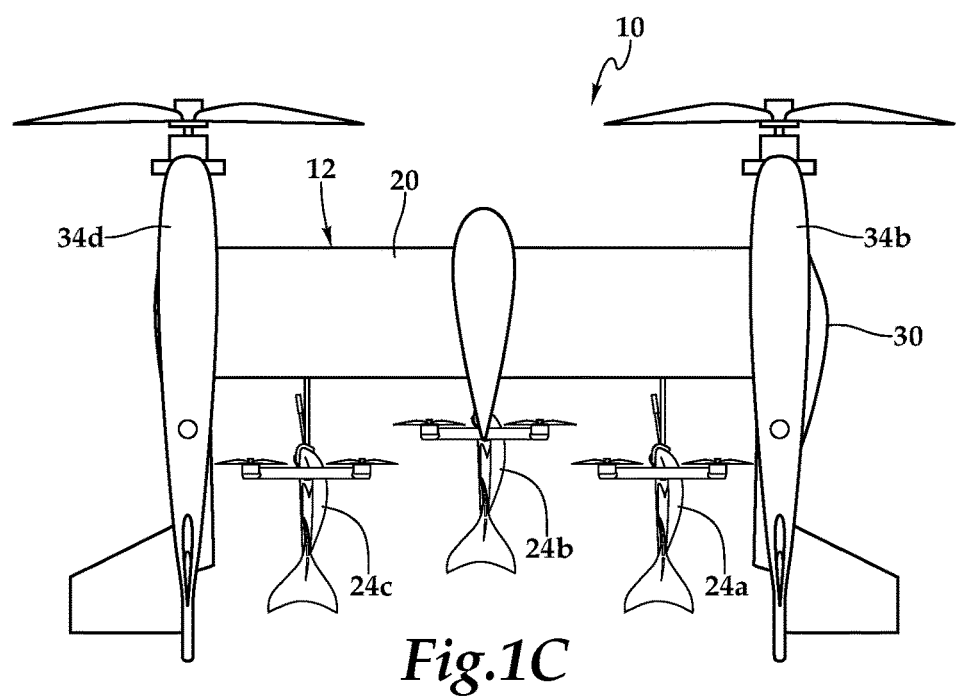
Figure 1F:
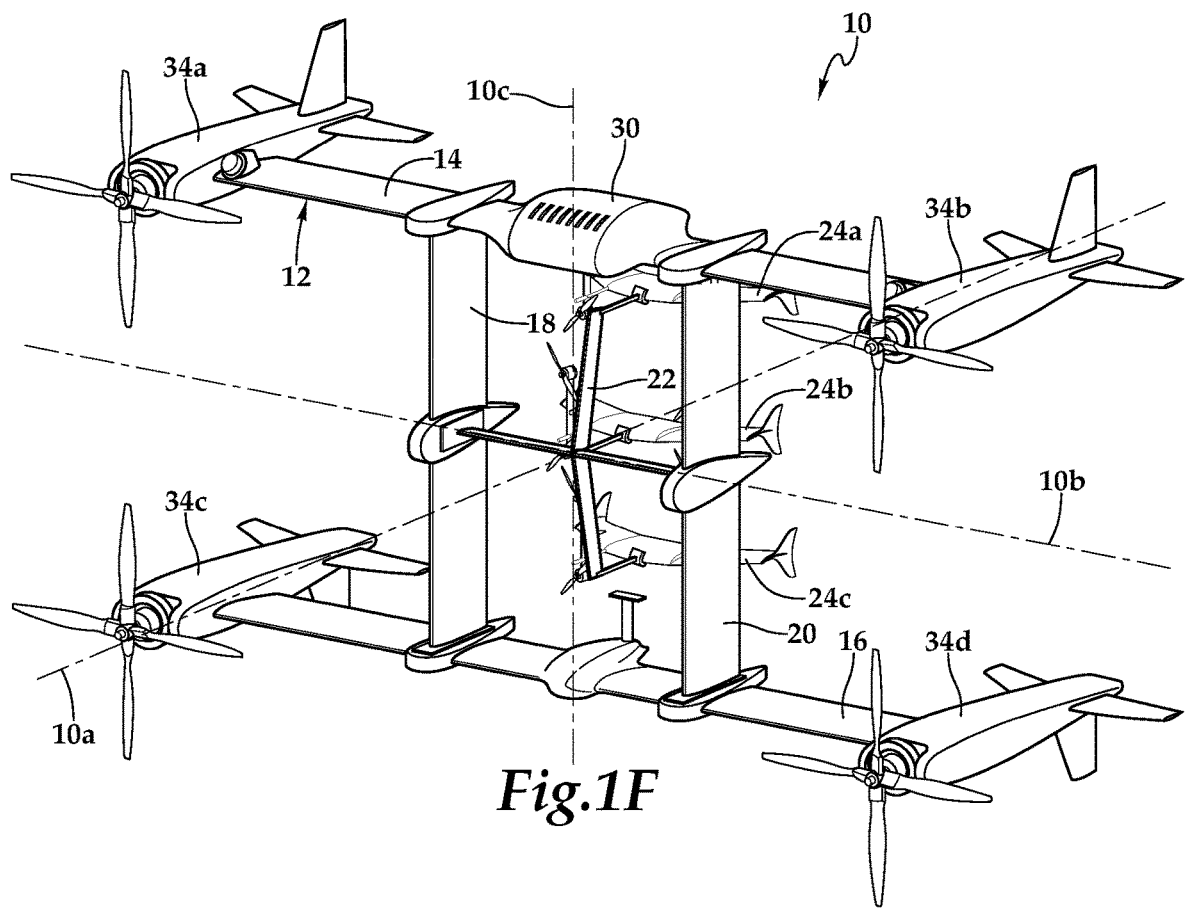
Figure 1E:
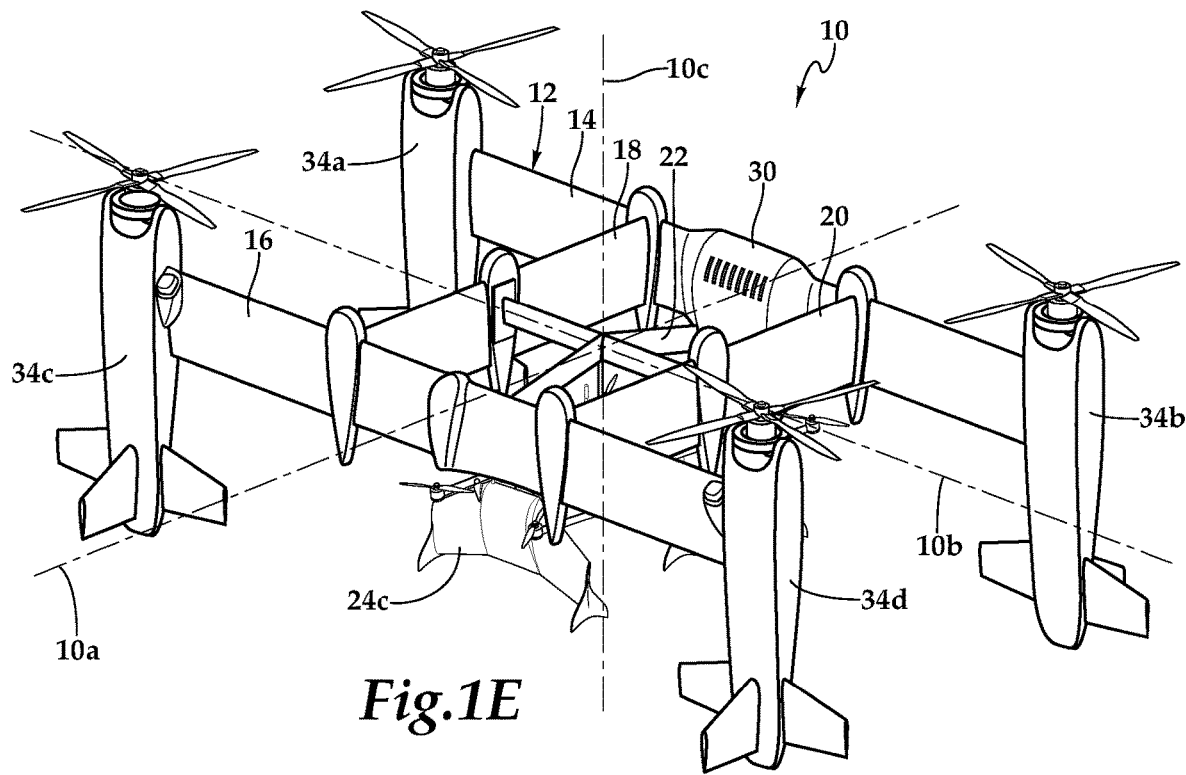

Referring to FIGS. 1A-1G in the drawings, various views of an aircraft 10 for the transportation and deployment of UAVs that is operable to transition between thrust-borne lift in a VTOL orientation and wing-borne lift in a biplane orientation are depicted. FIGS. 1A, 1C and 1E depict aircraft 10 in the VTOL orientation wherein the propulsion assemblies provide thrust-borne lift. FIGS. 1B, 1D and 1F depict aircraft 10 in the biplane orientation wherein the propulsion assemblies provide forward thrust with the forward airspeed of aircraft 10 providing wing-borne lift enabling aircraft 10 to have a high speed and/or high endurance forward flight mode. Aircraft 10 has a longitudinal axis 10$a$ that may also be referred to as the roll axis, a lateral axis 10$b$ that may also be referred to as the pitch axis and a vertical axis 10$c$ that may also be referred to as the yaw axis, as best seen in FIGS. 1E and 1F. When longitudinal axis 10$a$ and lateral axis 10$b$ are both in a horizontal plane and normal to the local vertical in the earth's reference frame, aircraft 10 has a level flight attitude.

In the illustrated embodiment, aircraft 10 has an airframe 12 including wings 14, 16 each having an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. As best seen in FIG. 1B, in the biplane orientation of aircraft 10, wing 14 is an upper wing having a straight wing configuration and wing 16 is a lower wing having a straight wing configuration. In other embodiments, wings 14, 16 could have other designs such as anhedral and/or dihedral wing designs, swept wing designs or other suitable wing designs. In the illustrated embodiment, wings 14, 16 are substantially parallel with each other. Extending generally perpendicularly between wings 14, 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. In the illustrated embodiment, pylons 18, 20 are substantially parallel with each other and have an aerodynamic shape.

Figure 1G:
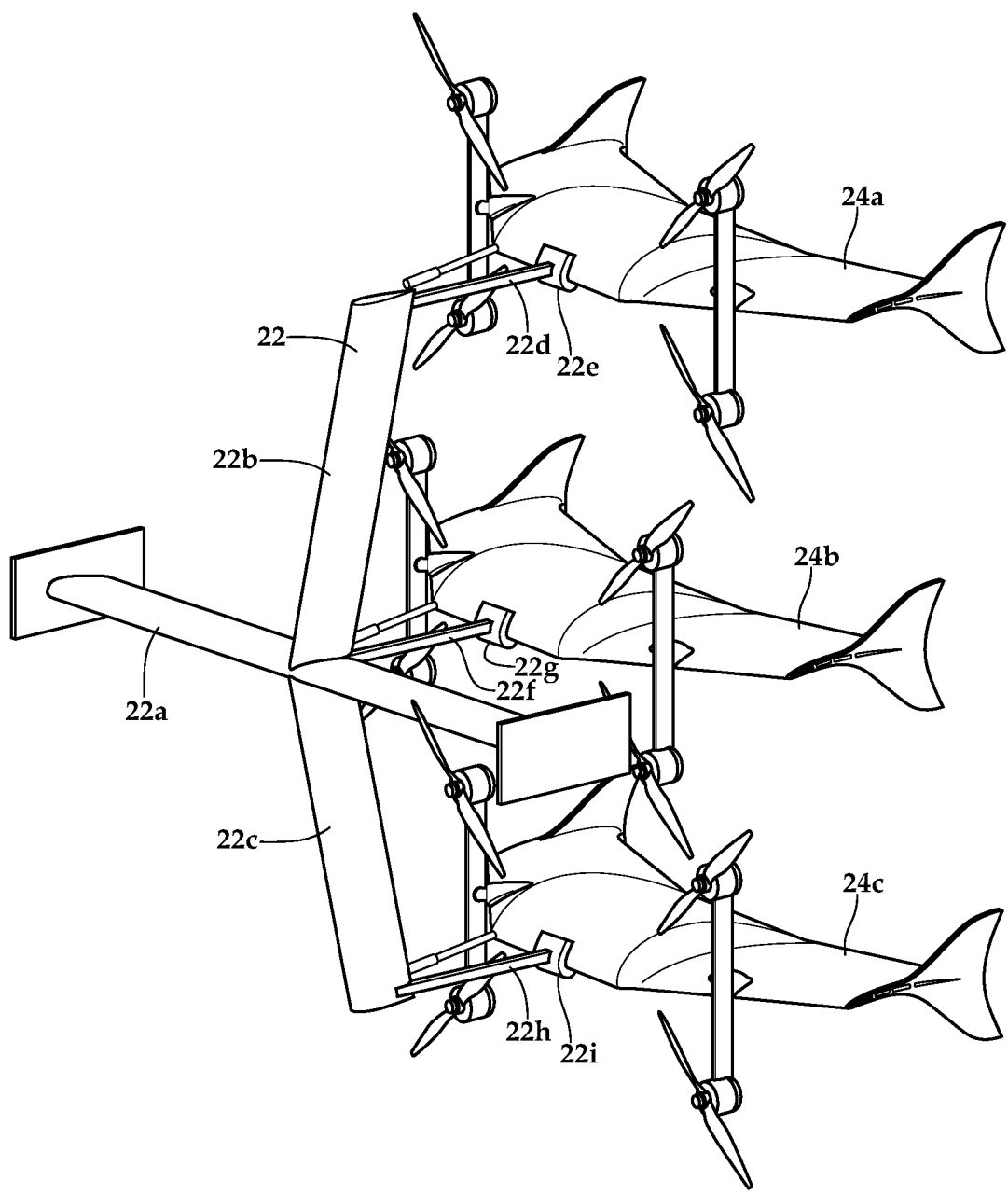

Aircraft 10 includes an UAV carrier assembly 22 that is coupled between pylons 18, 20. UAV carrier assembly 22 is preferably formed from high strength and lightweight materials such as fiberglass, carbon, plastic, metal or other suitable material or combination of materials. As best seen in FIG. 1G, UAV carrier assembly 22 includes a substantially horizontal cross member 22$a$ that is coupled between pylons 18, 20, an upper beam 22$b$ extending substantially vertically upward from cross member 22$a$ and a lower beam 22$c$ extending substantially vertically downward from cross member 22$a$, when aircraft 10 is in the biplane orientation. As illustrated, upper and lower beams 22$b$, 22$c$ have an aft swept design. In addition, each of cross member 22$a$, upper beam 22$b$ and lower beam 22$c$ has an aerodynamic shape. Extending aftward from upper beam 22$b$ is a support arm 22$d$ having a UAV station 22$e$ on a distal end thereof. Extending aftward from cross member 22$a$ is a support arm 22$f$ having a UAV station 22$g$ on a distal end thereof. Extending aftward from lower beam 22$c$ is a support arm 22$h$ having a UAV station 22$i$ on a distal end thereof. In the biplane orientation of aircraft 10, UAV stations 22e, 22g, 22i are vertically stacked. Each of UAV stations 22e, 22g, 22i is configured to receive, secure, transport and deploy a respective UAV 24a, 24b, 24c, which may generically and/or collectively be referred to as UAVs 24. UAV stations 22e, 22g, 22i may provide one or more of a mechanical coupling, a magnetic coupling, an electrical coupling, a power communication coupling and/or a data communication coupling with respective UAV 24a, 24b, 24c. For example, the couplings between respective UAV stations 22e, 22g, 22i and UAVs 24 may include one or more pin and socket connections that provide mechanical support and, in some embodiments, power and/or data channels therebetween. As another example, the couplings between respective UAV stations 22e, 22g, 22i and UAVs 24 may include a magnetic connection formed using an electromagnetic. In a further example, the couplings between respective UAV stations 22e, 22g, 22i and UAVs 24 may include an inductive connection that provides power and/or data channels therebetween.

Referring additional to FIGS. 2A-2D, a UAV 24 is depicted in greater detail. UAV 24 may be multirole aircraft having a digital flight control and navigation system and the ability for swarm networking and cooperation. In the illustrated embodiment, UAV 24 is depicted as a flying wing with a swept wing design and an airfoil cross-section along the chord stations thereof that generates lift responsive to the forward airspeed of UAV 24. In the illustrated embodiment, UAV 24 has a sensor system 26a that may include a sensor array having one or more of an optical camera, a thermal camera, an infrared camera, a video camera, an intelligence, surveillance and reconnaissance module and/or other desired sensors. Sensor system 26a may provide real time images and/or video to a ground station using a wireless communications protocol. Alternatively or additionally, sensor system 26a may capture and store information during a mission for download after the mission.

In its flight configuration, UAV 24 has a two-dimensional distributed thrust array including four propulsion assemblies 28a, 28b, 28c, 28d that are independently operated and controlled by the flight control system of UAV 24. Propulsion assemblies 28a, 28b are coupled to distal ends of a motor mount 28e and propulsion assemblies 28c, 28d are coupled to distal ends of a motor mount 28f. In the illustrated embodiment, motor mounts 28e, 28f are rotatably coupled to the leading edge of the flying wing to enable UAV 24 to transition between the flight configuration depicted in FIGS. 2A-2C and a compact storage configuration, as best seen in FIG. 2D. In the compact storage configuration, motor mounts 28e, 28f extend substantially parallel with the leading edge of the flying wing. UAV 24 includes a receiving station 26b that is configured to couple with one of the UAV stations 22e, 22g, 22i of UAV carrier assembly 22. For example, receiving station 26b may provide an interface for one or more of a mechanical coupling, a magnetic coupling, an electrical coupling, a power communication coupling and/or a data communication coupling with one of the UAV stations 22e, 22g, 22i of UAV carrier assembly 22. Even though a particular UAV has been described and depicted, it should be understood by those having ordinary skill in the art that UAV 24 is exemplary of a number of UAVs having a variety of designs and capabilities that could be received, secured, transported and deployed by aircraft 10.

Referring again to FIGS. 1A-1G, aircraft 10 has a flight control system 30 supported by wing 14. Flight control system 30 is preferably a redundant digital flight control system including multiple independent flight control computers. For example, the use of a triply redundant flight control system 30 improves the overall safety and reliability of aircraft 10 in the event of a failure in flight control system 30. Flight control system 30 preferably includes non-transitory computer readable storage media including a set of computer instructions executable by one or more processors for controlling the operation of aircraft 10. Flight control system 30 may be implemented on one or more general-purpose computers, special purpose computers or other machines with memory and processing capability. For example, flight control system 30 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 30 may be a microprocessor-based system operable to execute program code in the form of machine-executable instructions. In addition, flight control system 30 may be selectively connectable to other computer systems via a proprietary encrypted network, a public encrypted network, the Internet or other suitable communication network that may include both wired and wireless connections.

One or more of wings 14, 16 and/or pylons 18, 20 may contain one or more electrical power sources depicted as a plurality of batteries 32 in pylon 20, as best seen in FIG. 1D. Batteries 32 supplies electrical power to flight control system 30, the distributed thrust array of aircraft 10, UAVs 24 and other power consumers of aircraft 10 such that aircraft 10 may be referred to as an electric vertical takeoff and landing (eVTOL) aircraft. In some embodiments, aircraft 10 may have a hybrid power system that includes one or more internal combustion engines and an electric generator. Preferably, the electric generator is used to charge batteries 32. In other embodiments, the electric generator may provide power directly to a power management system and/or the power consumers of aircraft 10. In still other embodiments, aircraft 10 may use fuel cells as the electrical power source.

Wings 14, 16, pylons 18, 20 and/or UAV carrier assembly 22 may contain a communication network that enables flight control system 30 to communicate with the distributed thrust array of aircraft 10 and UAVs 24. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assembly.

The two-dimensional distributed thrust array of aircraft 10 includes a plurality of propulsion assemblies, individually denoted as 34a, 34b, 34c, 34d and collectively referred to as propulsion assemblies 34. In the illustrated embodiment, propulsion assemblies 34a, 34b are coupled at the wingtips of wing 14 and propulsion assemblies 34c, 34d are coupled at the wingtips of wing 16. By positioning propulsion assemblies 34a, 34b, 34c, 34d at the wingtip of wings 14, 16, the thrust and torque generating elements are positioned at the maximum outboard distance from the center of gravity of aircraft 10 located, for example, at the intersection of axes 10a, 10b, 10c. The outboard locations of propulsion assemblies 34 provide dynamic stability to aircraft 10 in hover and a high dynamic response in the VTOL orientation of aircraft 10 enabling efficient and effective pitch, yaw and roll control by changing the thrust, thrust vector and/or torque output of certain propulsion assemblies 34 relative to other propulsion assemblies 34.

Even though the illustrated embodiment depicts four propulsion assemblies, the distributed thrust array of aircraft 10 could have other numbers of propulsion assemblies both greater than or less than four. Also, even though the illustrated embodiment depicts propulsion assemblies 34 in a wingtip mounted configuration, the distributed thrust array of aircraft 10 could have propulsion assemblies coupled to the wings in other configurations such as a mid-span configuration. Further, even though the illustrated embodiment depicts propulsion assemblies 34 in a mid-wing configuration, the distributed thrust array of aircraft 10 could have propulsion assemblies coupled to the wings in a low wing configuration, a high wing configuration or any combination or permutations thereof. In the illustrated embodiment, propulsion assemblies 34 are variable speed propulsion assemblies having fixed pitch rotor blades and thrust vectoring capability. Depending upon the implementation, propulsion assemblies 34 may have longitudinal thrust vectoring capability, lateral thrust vectoring capability or omnidirectional thrust vectoring capability. In other embodiments, propulsion assemblies 34 may be single speed propulsion assemblies, may have variable pitch rotor blades and/or may be non-thrust vectoring propulsion assemblies.

Propulsion assemblies 34 may be independently attachable to and detachable from airframe 12 and may be standardized and/or interchangeable units and preferably line replaceable units providing easy installation and removal from airframe 12. The use of line replaceable propulsion units is beneficial in maintenance situations if a fault is discovered with one of the propulsion assemblies. In this case, the faulty propulsion assembly 34 can be decoupled from airframe 12 by simple operations and another propulsion assembly 34 can then be attached to airframe 12. In other embodiments, propulsion assemblies 34 may be permanently coupled to wings 14, 16.

Referring to FIG. 1A, component parts of propulsion assembly 34d will now be described. It is noted that propulsion assembly 34d is representative of each propulsion assembly 34 therefore, for sake of efficiency, certain features have been disclosed only with reference to propulsion assembly 34d. One having ordinary skill in the art, however, will fully appreciate an understanding of each propulsion assembly 34 based upon the disclosure herein of propulsion assembly 34d. In the illustrated embodiment, propulsion assembly 34d includes a nacelle 36 that houses components including a battery 36a, an electronic speed controller 36b, one or more actuators 36c, an electronics node 34d, one or more sensors 36e and other desired electronic equipment. Nacelle 36 also supports a propulsion system 36f including a gimbal 36g, a variable speed electric motor 36h and a rotor assembly 36i. Nacelle 36 includes one or more aerosurfaces 36j. In the illustrated embodiment, aerosurfaces 36j include a stationary vertical stabilizer and active horizontal stabilizers that serve as elevators to control the pitch or angle of attack of wings 14, 16 and/or ailerons to control the roll or bank of aircraft 10 in the biplane orientation of aircraft 10. Aerosurfaces 36j also serve to enhance hover stability in the VTOL orientation of aircraft 10.

Flight control system 30 communicates via a wired communications network within airframe 12 with electronics nodes 36d of propulsion assemblies 34. Flight control system 30 receives sensor data from sensors 36e and sends flight command information to the electronics nodes 36d such that each propulsion assembly 34 may be individually and independently controlled and operated. For example, flight control system 30 is operable to individually and independently control the speed and the thrust vector of each propulsion system 36f. Flight control system 30 may autonomously control some or all aspects of flight operation for aircraft 10. Flight control system 30 is also operable to communicate with remote systems, such as a ground station via a wireless communications protocol. The remote system may be operable to receive flight data from and provide commands to flight control system 30 to enable remote flight control over some or all aspects of flight operation for aircraft 10. The autonomous and/or remote operation of aircraft 10 enables aircraft 10 to transport and deploy UAVs 24 to a desired location.

Figure 3C:
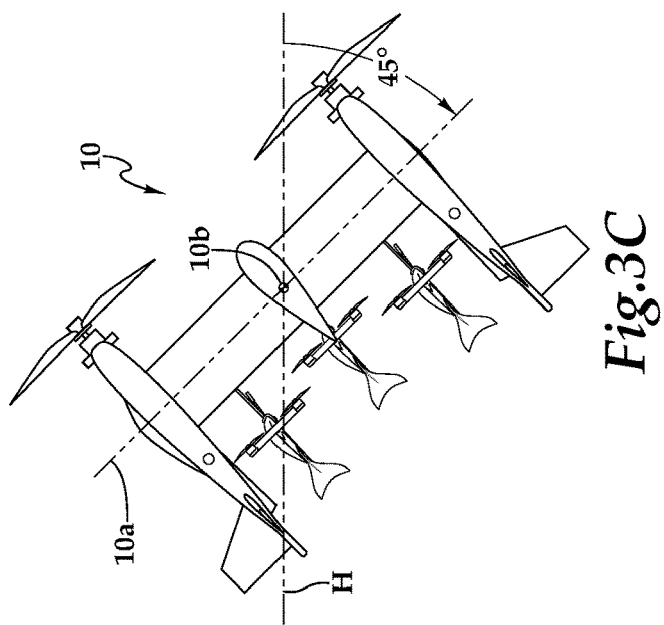
FIGS. 3A-3L are schematic illustrations of the aircraft of FIGS. 1A-1G in sequential flight operating scenarios in accordance with embodiments of the present disclosure.
Figure 3B:
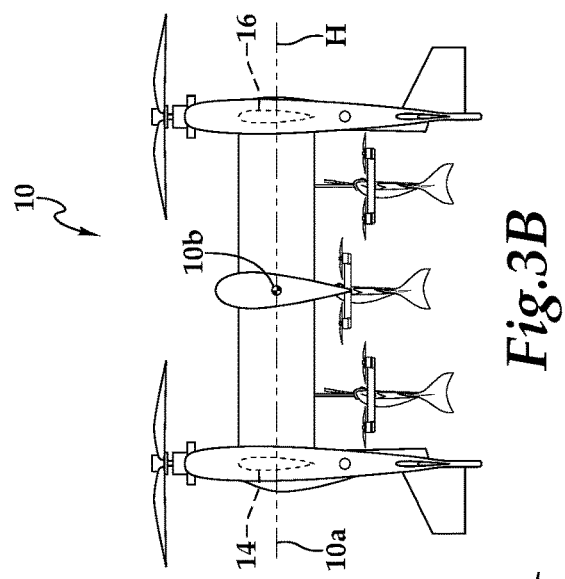
Figure 3A:
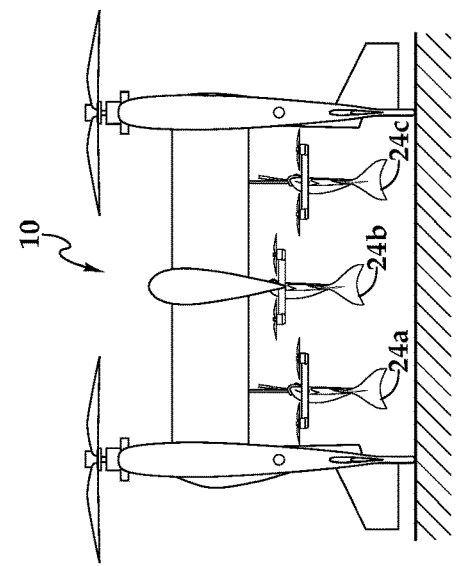
Figure 3E:
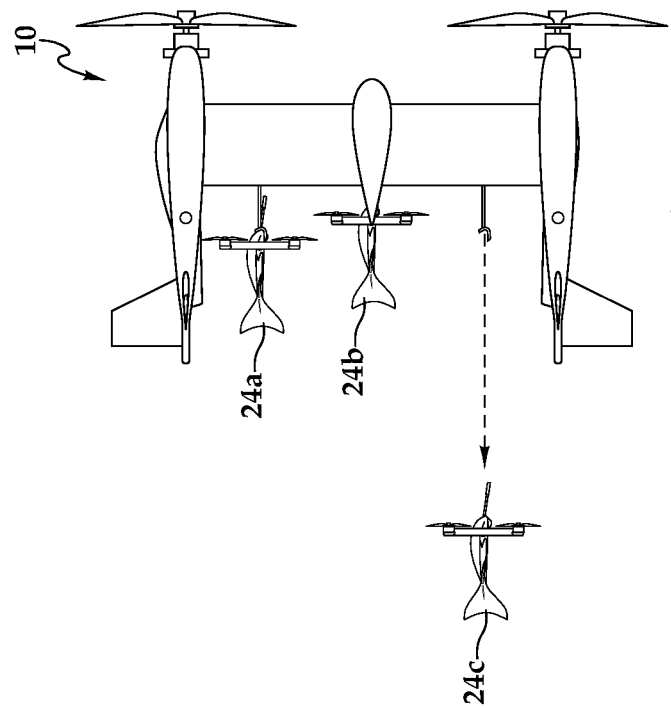

Referring additionally to FIGS. 3A-3L in the drawings, sequential flight-operating scenarios of aircraft 10 are depicted. As best seen in FIG. 3A, aircraft 10 is in a tailsitter position on a surface such as the ground or the deck of an aircraft carrier with three UAVs 24a, 24b, 24c secured to a UAV carrier assembly, as discussed herein. When aircraft 10 is ready for a UAV transportation and deployment mission, flight control system 30 commences operations providing flight commands to the various components of aircraft 10. Flight control system 30 may be operating responsive to autonomous flight control, remote flight control or a combination thereof. For example, it may be desirable to utilize remote flight control during certain maneuvers such as takeoff and landing but rely on autonomous flight control during hover, high speed forward flight and transitions between wing-borne flight and thrust-borne flight.

As best seen in FIG. 3B, aircraft 10 has performed a vertical takeoff and is engaged in thrust-borne lift in the VTOL orientation of aircraft 10. As illustrated, the rotor assemblies of each propulsion assembly 34 are rotating in the same horizontal plane. As longitudinal axis 10a and lateral axis 10b (denoted as the target) are both in a horizontal plane H that is normal to the local vertical in the earth's reference frame, aircraft 10 has a level flight attitude. In the VTOL orientation, wing 16 is the forward wing and wing 14 is the aft wing. As discussed herein, flight control system 30 independently controls and operates each propulsion assembly 34 including independently controlling speed and thrust vector. During hover, flight control system 30 may utilize differential speed control and/or differential or collective thrust vectoring of the propulsion assemblies 34 to provide hover stability for aircraft 10 and to provide pitch, roll, yaw and translation authority for aircraft 10.

After vertical ascent to the desired elevation, aircraft 10 may begin the transition from thrust-borne lift to wing-borne lift. As best seen from the progression of FIGS. 3B-3D, aircraft 10 is operable to pitch down from the VTOL orientation toward the biplane orientation to enable high speed and/or long range forward flight. As seen in FIG. 3C, longitudinal axis 10*a* extends out of the horizontal plane H such that aircraft 10 has an inclined flight attitude of about forty-five degrees pitch down. Flight control system 30 may achieve this operation through speed control of some or all of propulsion assemblies 34, thrust vectoring of some or all of propulsion assemblies 34 or any combination thereof.

Figure 3D:
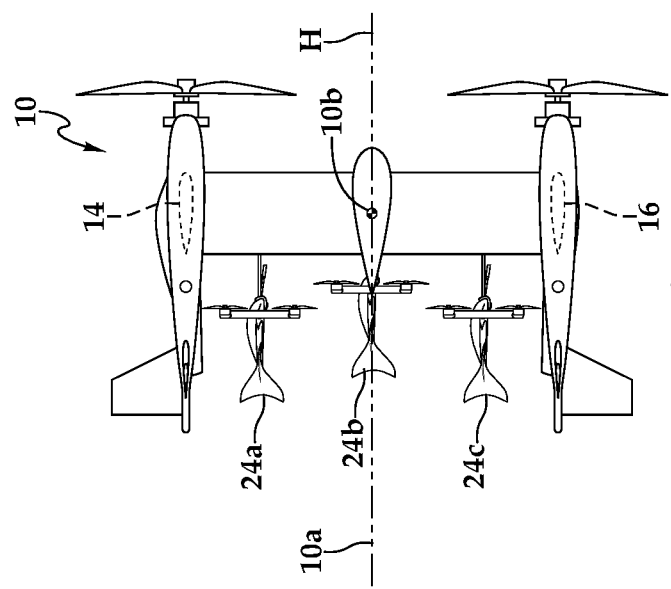
Figure 3G:
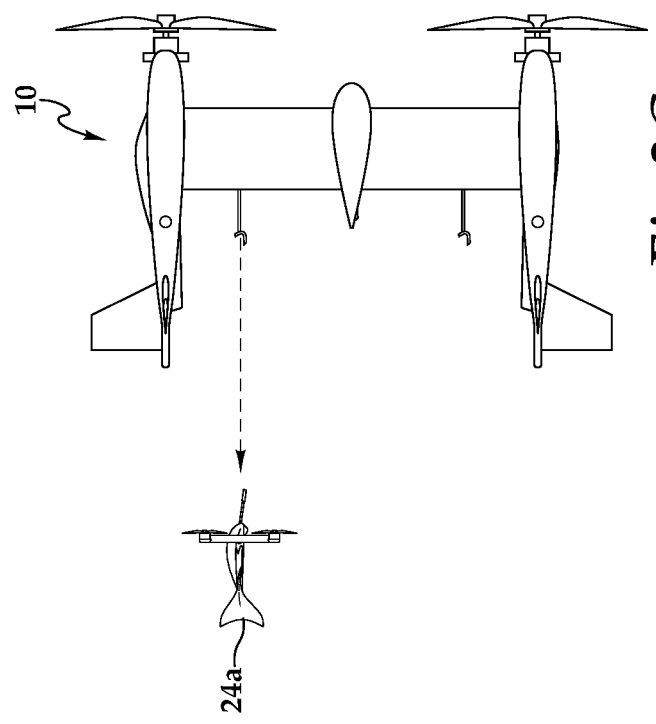
Figure 3F:
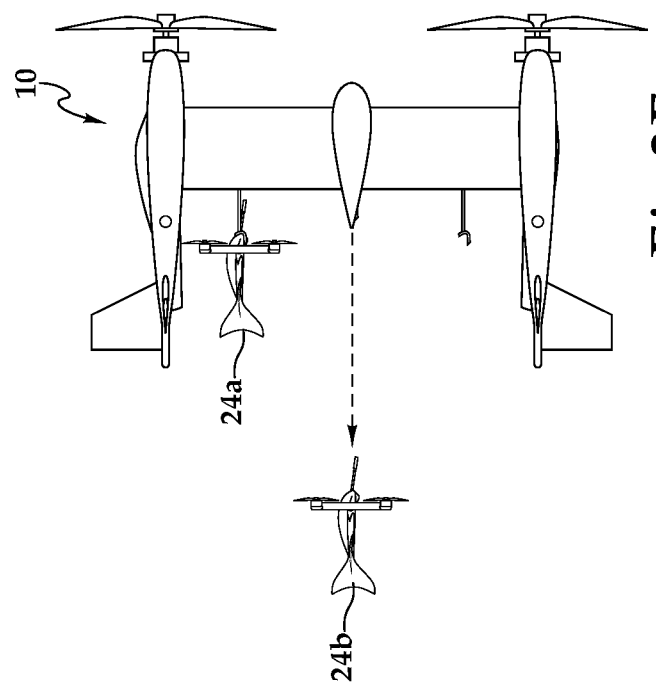

As best seen in FIG. 3D, aircraft 10 has completed the transition to the biplane orientation with the rotor assemblies of propulsion assemblies 34 each rotating in the same vertical plane. In the biplane orientation, wing 14 is the upper wing positioned above wing 16, which is the lower wing. By convention, longitudinal axis 10*a* has been reset to be in the horizontal plane H, which also includes lateral axis 10*b*, such that aircraft 10 has a level flight attitude in the biplane orientation. As forward flight with wing-borne lift requires significantly less power than VTOL flight with thrust-borne lift, the operating speed of some or all of the propulsion assemblies 34 may be reduced. In certain embodiments, some of the propulsion assemblies of aircraft 10 could be shut down during forward flight. In the biplane orientation, the independent control provided by flight control system 30 over each propulsion assembly 34 provides pitch, roll and yaw authority for aircraft 10.

When aircraft 10 reaches the desired release location for UAVs 24, flight control system 30 provides the launch commands for the UAV carrier assembly to release UAVs 24. Depending upon the type of coupling between the UAV carrier assembly and UAVs 24, the launch commands may result in a mechanical actuation that allows UAVs 24 to separate from the UAV carrier assembly. Alternatively, the launch commands may unenergized electromagnets that enable UAVs 24 to separate from the UAV carrier assembly. In one implementation, flight control system 30 provides launch commands to sequentially release UAVs 24. As best seen from the progression of FIGS. 3D-3G, aircraft 10 initially releases UAV 24*c* as indicated by the launch arrow in FIG. 3E, then aircraft 10 releases UAV 24*b* as indicated by the launch arrow in FIG. 3F and finally aircraft 10 releases UAV 24*a* as indicated by the launch arrow in FIG. 3G. In the illustrated embodiment, UAVs 24 are released aftward from aircraft 10 when aircraft 10 is in the biplane orientation. Following their release, UAVs 24 perform their intended missions independent of aircraft 10. In some implementations, aircraft 10 may loiter in the air for a recovery operation of UAVs 24. In the illustrated example, however, aircraft 10 flies to a landing site such as the original takeoff location or other suitable location, leaving UAVs 24 to complete their missions.

Figure 3J:
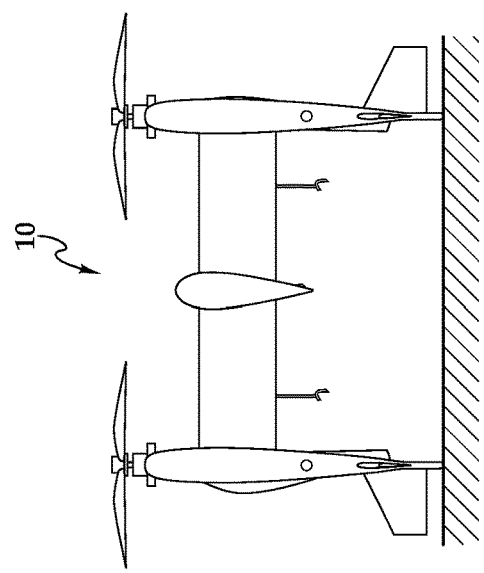
Figure 3I:
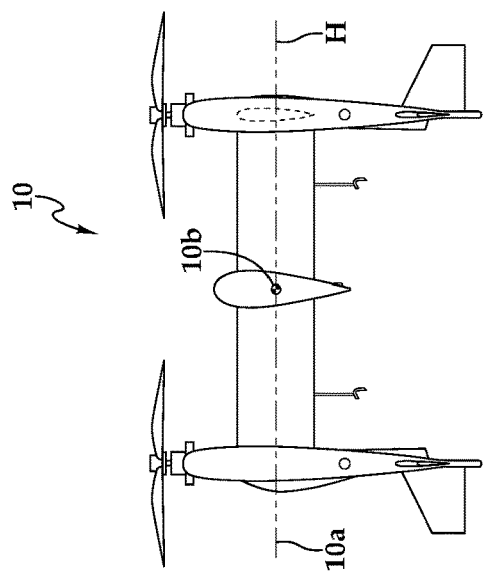
Figure 3H:
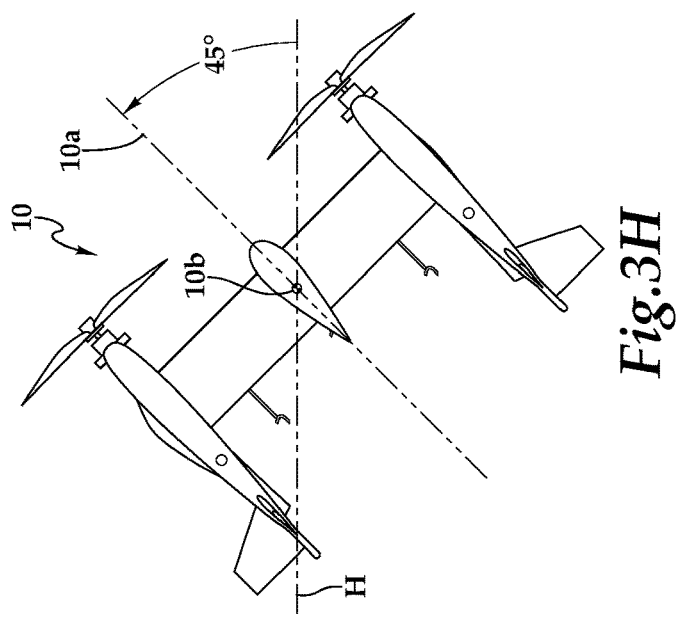
Figure 3L:
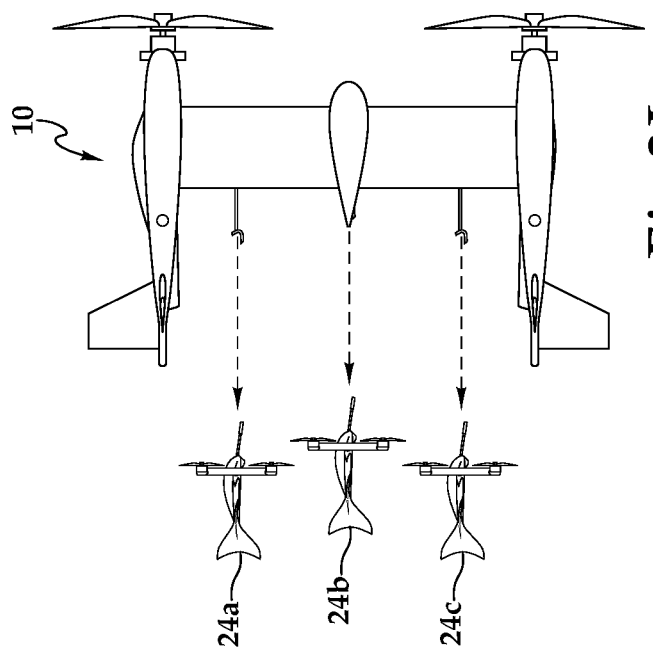
Figure 3K:
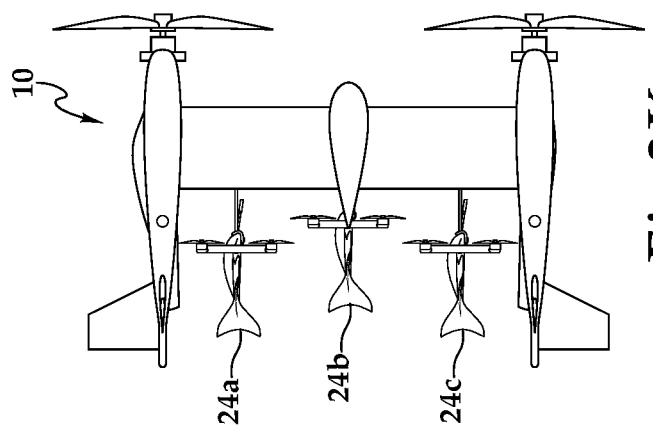

As aircraft 10 approaches the desired landing site, aircraft 10 may begin its transition from wing-borne lift to thrust-borne lift. As best seen from the progression of FIGS. 3G-3I, aircraft 10 is operable to pitch up from the biplane orientation to the VTOL orientation to enable, for example, a vertical landing operation. As seen in FIG. 3H, longitudinal axis 10*a* extends out of the horizontal plane H such that aircraft 10 has an inclined flight attitude of about forty-five degrees pitch up. Flight control system 30 may achieve this operation through speed control of some or all of propulsion assemblies 34, thrust vectoring of some or all of propulsion assemblies 34 or any combination thereof. In FIG. 3I, aircraft 10 has completed the transition from the biplane orientation to the VTOL orientation and, by convention, longitudinal axis 10*a* has been reset to be in the horizontal plane H which also includes lateral axis 10*b* such that aircraft 10 has a level flight attitude in the VTOL orientation. Once aircraft 10 has completed the transition to the VTOL orientation, aircraft 10 may commence its vertical descent to a surface. As best seen in FIG. 3J, aircraft 10 has landed in a tailsitter orientation at the desired location.

Even though aircraft 10 has been depicted and described as launching UAVs 24 in a particular sequence, it should be understood by those having ordinary skill in the art that aircraft 10 could launch UAVs 24 in any sequence. In addition, even though aircraft 10 has been depicted and described as sequentially launching UAVs 24, it should be understood by those having ordinary skill in the art that aircraft 10 could alternatively launch UAVs 24*a*, 24*b*, 24*c* simultaneously, as best seen from the progression of FIGS. 3K-3L and as indicated by the launch arrows in FIG. 3L. Further, it should be understood by those having ordinary skill in the art that aircraft 10 could alternatively launch certain of UAVs 24 simultaneously and others of UAVs 24 sequentially.

Figure 4A:
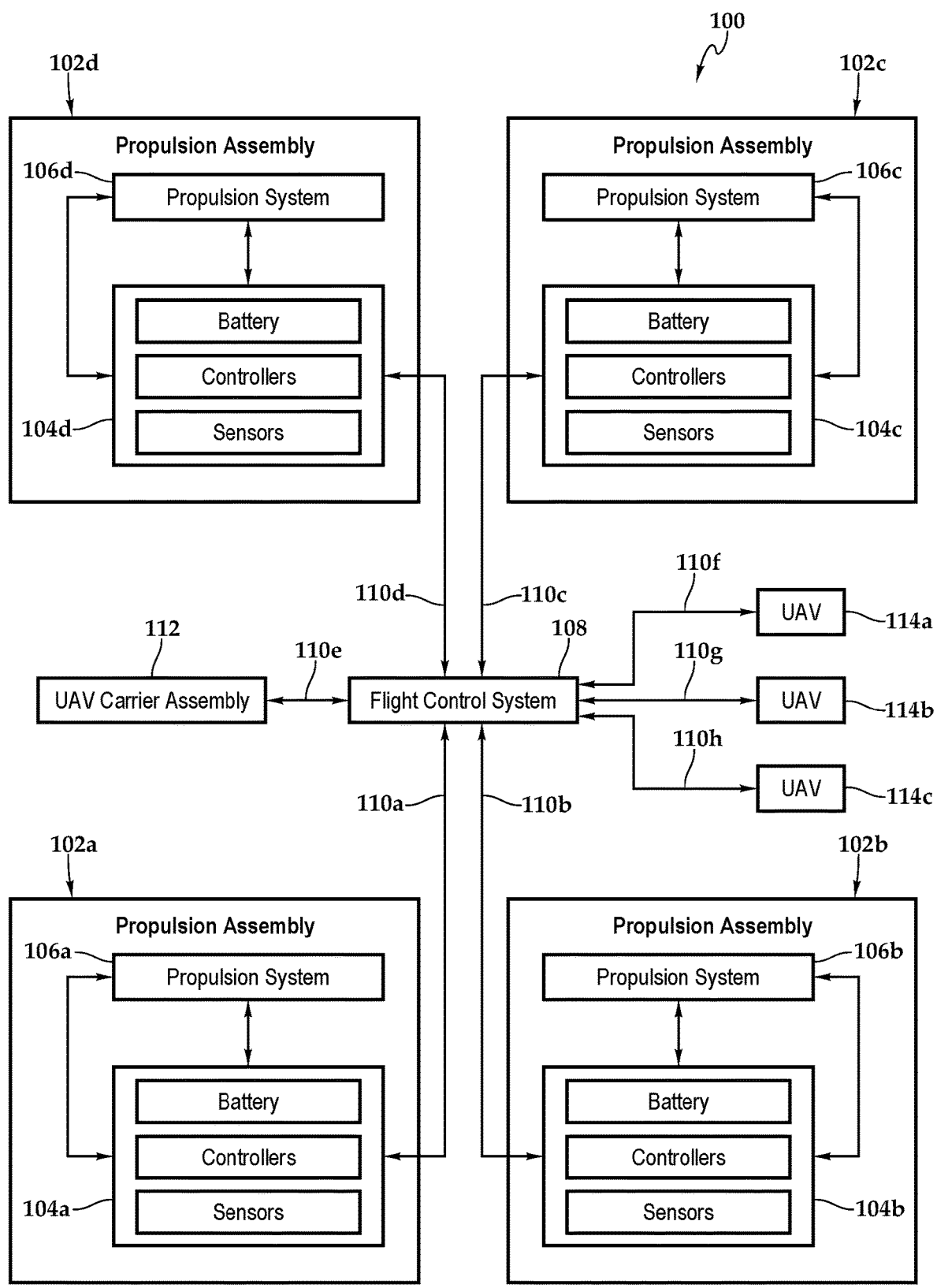
FIG. 4A is a block diagram of one implementation of a flight control system for an aircraft for transporting and deploying UAVs in accordance with embodiments of the present disclosure.

Referring next to FIG. 4A, a block diagram illustrates one implementation of a flight control system for an aircraft 100 that is representative of aircraft 10 discussed herein. Specifically, aircraft 100 includes four propulsion assemblies 102*a*, 102*b*, 102*c*, 102*d* that form a two-dimensional thrust array of thrust vectoring propulsion assemblies. Propulsion assembly 102*a* includes an electronics node 104*a* depicted as including controllers, sensors and one or more batteries. Propulsion assembly 102*a* also includes a propulsion system 106*a* described herein as including an electric motor and a rotor assembly. Propulsion assembly 102*b* includes an electronics node 104*b* depicted as including controllers, sensors and one or more batteries. Propulsion assembly 102*b* also includes a propulsion system 106*b*. Propulsion assembly 102*c* includes an electronics node 104*c* depicted as including controllers, sensors and one or more batteries. Propulsion assembly 102*c* also includes a propulsion system 106*c*. Propulsion assembly 102*d* includes an electronics node 104*d* depicted as including controllers, sensors and one or more batteries. Propulsion assembly 102*d* also includes a propulsion system 106*d*. A flight control system 108 is operably associated with each of propulsion assemblies 102*a*, 102*b*, 102*c*, 102*d* and is linked to the electronic nodes 104*a*, 104*b*, 104*c*, 104*d* by a communications network depicted as arrows 110*a*, 110*b*, 110*c*, 110*d*. Flight control system 108 receives sensor data from and sends commands to propulsion assemblies 102*a*, 102*b*, 102*c*, 102*d* to enable flight control system 108 to independently control each of propulsion assemblies 102*a*, 102*b*, 102*c*, 102*d*, as discussed herein. In the illustrated embodiment, flight control system 108 is in communication with UAV carrier assembly 112 over the communications network depicted as arrow 110*e* to provide commands to UAV carrier assembly 112 to secure and to launch UAVs 114*a*, 114*b*, 114*c*. In addition, flight control system 108 is in communication with UAVs 114*a*, 114*b*, 114*c* over the communications network depicted as arrows 110*f*, 110*g*, 110*h* to provide power to charge or recharge batteries in UAVs 114*a*, 114*b*, 114*c*, to upload information to UAVs 114*a*, 114*b*, 114*c* such as mission parameters and/or to download information from UAVs 114*a*, 114*b*, 114*c* such as surveillance information obtained by UAVs 114*a*, 114*b*, 114*c* during a mission.

Figure 4B:
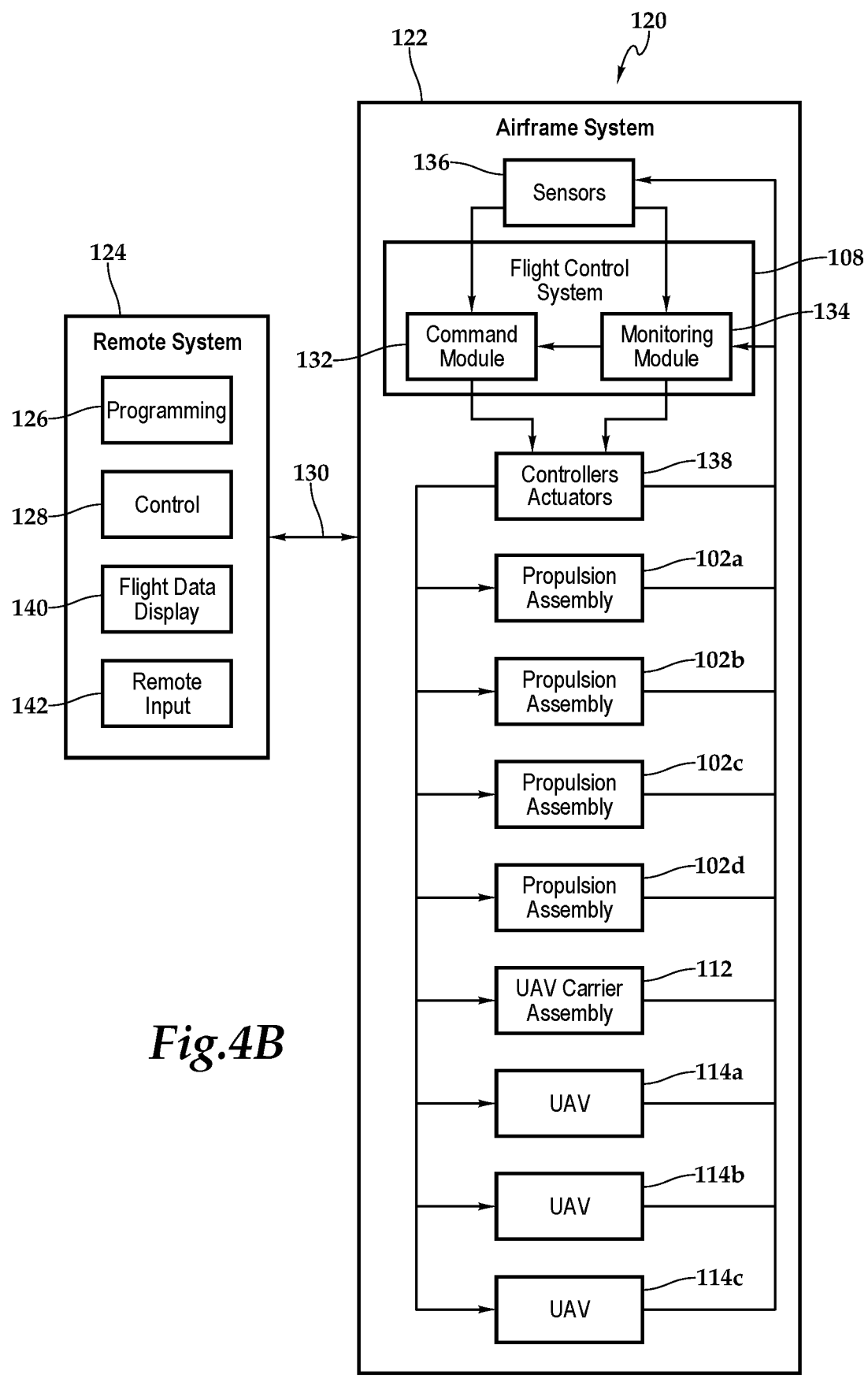
FIG. 4B is a block diagram of autonomous and remote control systems for an aircraft for transporting and deploying UAVs in accordance with embodiments of the present disclosure.

Referring additionally to FIG. 4B in the drawings, a block diagram depicts a control system 120 operable for use with aircraft 100 or aircraft 10 of the present disclosure. In the illustrated embodiment, system 120 includes two primary computer based subsystems; namely, an airframe system 122 and a remote system 124. In some implementations, remote system 124 includes a programming application 126 and a remote control application 128. Programming application 126 enables a user to provide a flight plan and mission information to aircraft 100 such that flight control system 108 may engage in autonomous control over aircraft 100. For example, programming application 126 may communicate with flight control system 108 over a wired or wireless communication channel 130 to provide a flight plan including, for example, a starting point, a trail of waypoints and an ending point such that flight control system 108 may use waypoint navigation during the mission. In addition, programming application 126 may provide one or more tasks to flight control system 108 for aircraft 100 to accomplish during the mission such as deployment of UAVs 114a, 114b, 114c at a desired location. Following programming, aircraft 100 may operate autonomously responsive to commands generated by flight control system 108.

In the illustrated embodiment, flight control system 108 includes a command module 132 and a monitoring module 134. It is to be understood by those skilled in the art that these and other modules executed by flight control system 108 may be implemented in a variety of forms including hardware, software, firmware, special purpose processors and combinations thereof. Flight control system 108 receives input from a variety of sources including internal sources such as sensors 136, controllers/actuators 138, propulsion assemblies 102a, 102b, 102c, 102d, UAV carrier assembly 112 and UAVs 114a, 114b, 114c as well as external sources such as remote system 124, global positioning system satellites or other location positioning systems and the like.

During the various operating modes of aircraft 100 including the vertical takeoff and landing flight mode, the hover flight mode, the forward flight mode and transitions therebetween, command module 132 provides commands to controllers/actuators 138. These commands enable independent operation of each propulsion assembly 102a, 102b, 102c, 102d and independent launch of each UAV 114a, 114b, 114c. Flight control system 108 receives feedback from controllers/actuators 138, propulsion assemblies 102a, 102b, 102c, 102d and UAVs 114a, 114b, 114c. This feedback is processes by monitoring module 134 that can supply correction data and other information to command module 132 and/or controllers/actuators 138. Sensors 136, such as an attitude and heading reference system (AHRS) with solid-state or microelectromechanical systems (MEMS) gyroscopes, accelerometers and magnetometers as well as other sensors including positioning sensors, speed sensors, environmental sensors, fuel sensors, temperature sensors, location sensors and the like also provide information to flight control system 108 to further enhance autonomous control capabilities.

Some or all of the autonomous control capability of flight control system 108 can be augmented or supplanted by remote flight control from, for example, remote system 124. Remote system 124 may include one or computing systems that may be implemented on general-purpose computers, special purpose computers or other machines with memory and processing capability. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 124 communicates with flight control system 108 via a communication link 130 that may include both wired and wireless connections.

While operating remote control application 128, remote system 124 is configured to display information relating to one or more aircraft of the present disclosure on one or more flight data display devices 140. Display devices 140 may be configured in any suitable form, including, for example, liquid crystal displays, light emitting diode displays or any suitable type of display. Remote system 124 may also include audio output and input devices such as a microphone, speakers and/or an audio port allowing an operator to communicate with other operators or a base station. The display device 140 may also serve as a remote input device 142 if a touch screen display implementation is used, however, other remote input devices, such as a keyboard or joystick, may alternatively be used to allow an operator to provide control commands to an aircraft being operated responsive to remote control. In some implementation, remote control application 128 may be used to provide mission parameters to UAVs 114a, 114b, 114c and remote input device 142 may be used to provide launch commands to sequentially or simultaneously release UAVs 114a, 114b, 114c at the desired location.

Figure 5:
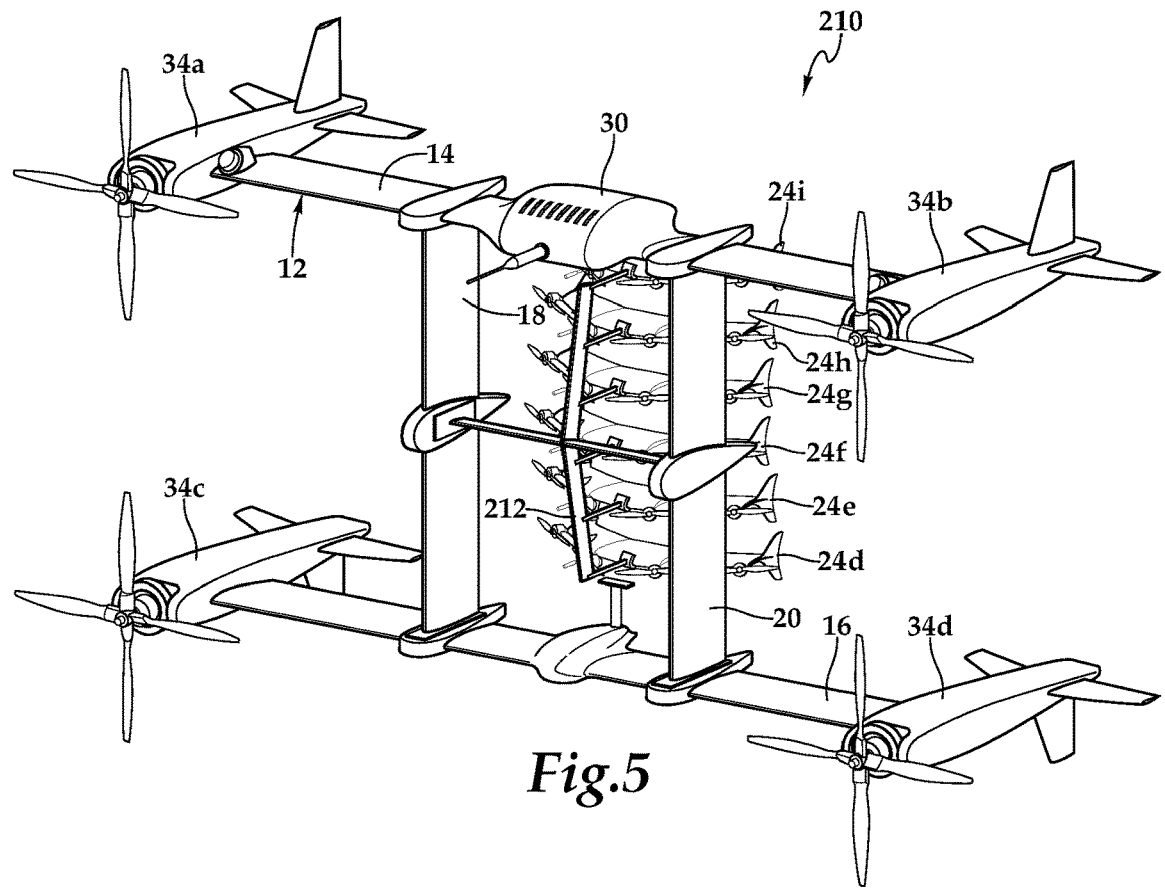
FIG. 5 is a schematic illustration of an aircraft for transporting and deploying UAVs that is operable to convert between thrust-borne lift in a VTOL orientation and wing-borne lift in a biplane orientation in accordance with embodiments of the present disclosure.

Even though the aircraft of the present disclosure have been described and depicted as including a UAV carrier assembly that is configured to receive, secure, transport and deploy three UAVs, it should be understood by those having ordinary skill in the art that an aircraft of the present disclosure could receive, secure, transport and deploy any number of UAVs both less than or greater than three. For example, FIG. 5 depicts an aircraft 210 that is operable to transition between thrust-borne lift in a VTOL orientation and wing-borne lift in a biplane orientation that is substantially similar to aircraft 10 except that aircraft 210 includes a UAV carrier assembly 212 that is configured to receive, secure, transport and deploy six UAVs 24d, 24e, 24f, 24g, 24h, 24i. In the illustrated embodiment, UAVs 24 are vertically stacked in their compact storage configuration (see FIG. 2D) such that aircraft 210 can support a greater density of UAVs 24. UAVs 24 may have a mechanical coupling, a magnetic coupling, an electrical coupling, a power communication coupling and/or a data communication coupling with their respective UAV stations of UAV carrier assembly 212. Aircraft 210 is configured to release UAVs 24 simultaneously or in any sequential pattern aftward from aircraft 210.

Figure 6:
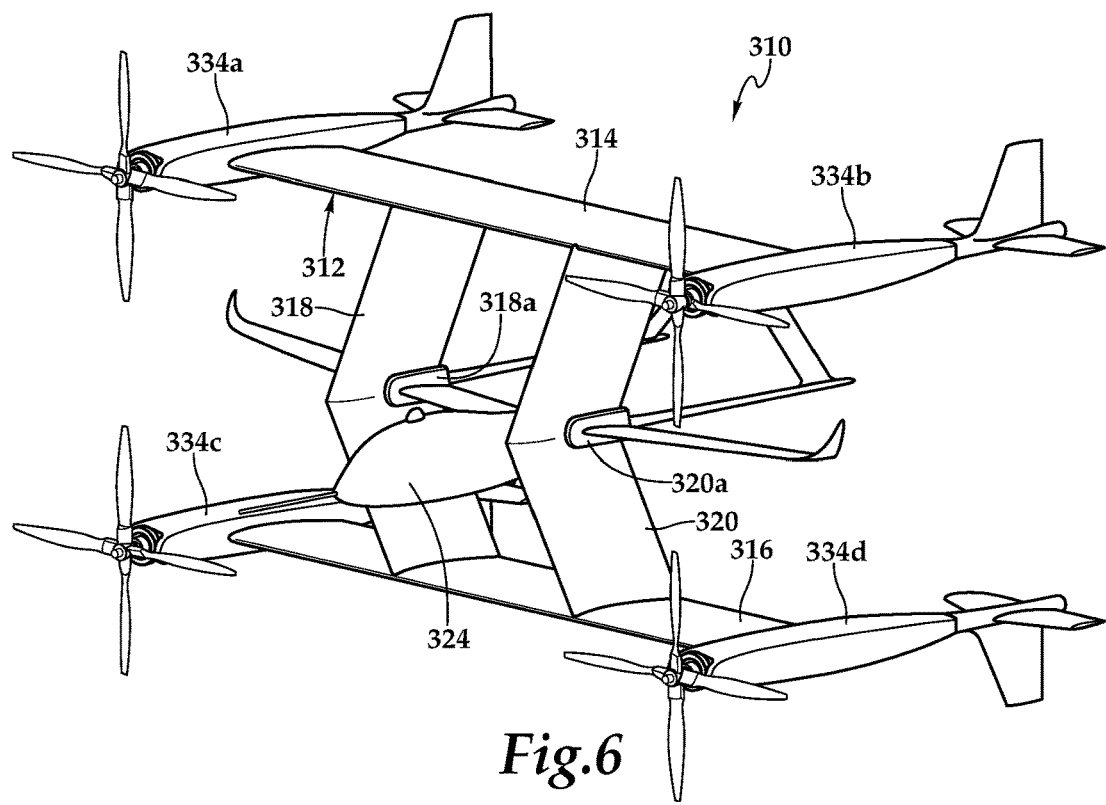
FIG. 6 is a schematic illustration of an aircraft for transporting and deploying UAVs that is operable to convert between thrust-borne lift in a VTOL orientation and wing-borne lift in a biplane orientation in accordance with embodiments of the present disclosure.

In another example, FIG. 6 depicts an aircraft 310 that is operable to transition between thrust-borne lift in a VTOL orientation and wing-borne lift in a biplane orientation. Aircraft 310 includes an airframe 312 including wings 314, 316 and pylons 318, 320 extending therebetween. As illustrated, pylons 318, 320 have an aft swept design with pylon 318 including a UAV station 318a and pylon 320 including a UAV station 320a. Aircraft 310 has a two-dimensional distributed thrust array that includes a plurality of propulsion assemblies 334a, 334b, 334c, 334d. Aircraft 310 includes a flight control system (not visible) that provides command and control to aircraft 310 in a manner similar to that of flight control system 30 and aircraft 10. Pylons 318, 320 are configured to receive, secure, transport and deploy a single UAV 324 with the cooperation of UAV stations 318a, 320a. For example, UAV 324 may have a mechanical coupling, a magnetic coupling, an electrical coupling, a power communication coupling and/or a data communication coupling with UAV stations 318a, 320a.

Figure 7A:
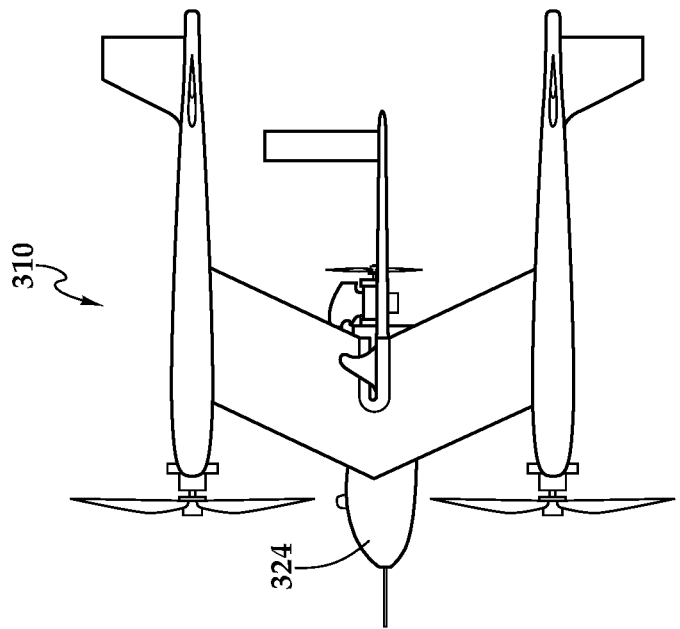
FIGS. 7A-7D are schematic illustrations of the aircraft of FIG. 6 in sequential flight operating scenarios in accordance with embodiments of the present disclosure.
Figure 7B:
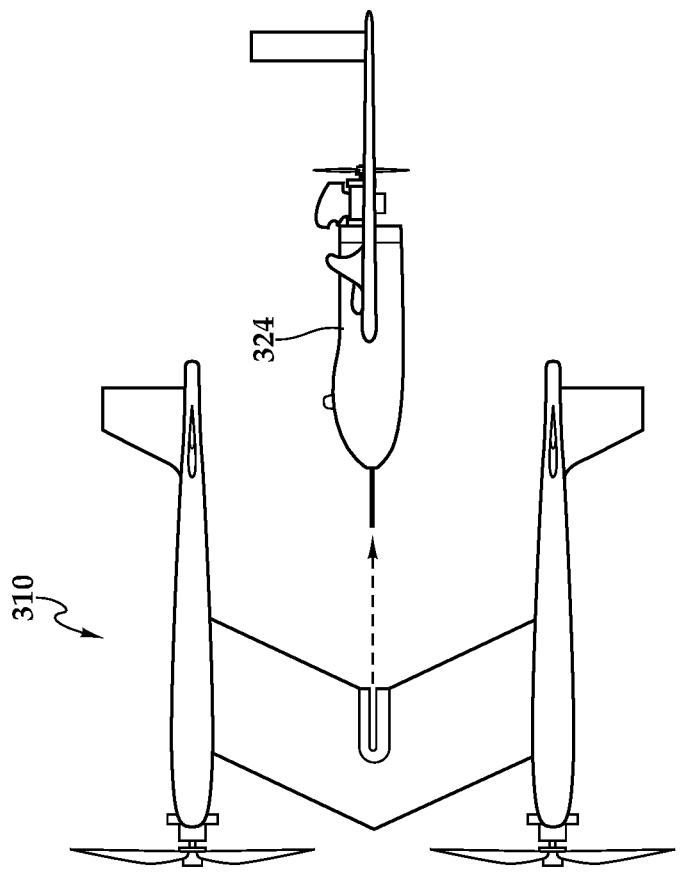
Figure 7C:
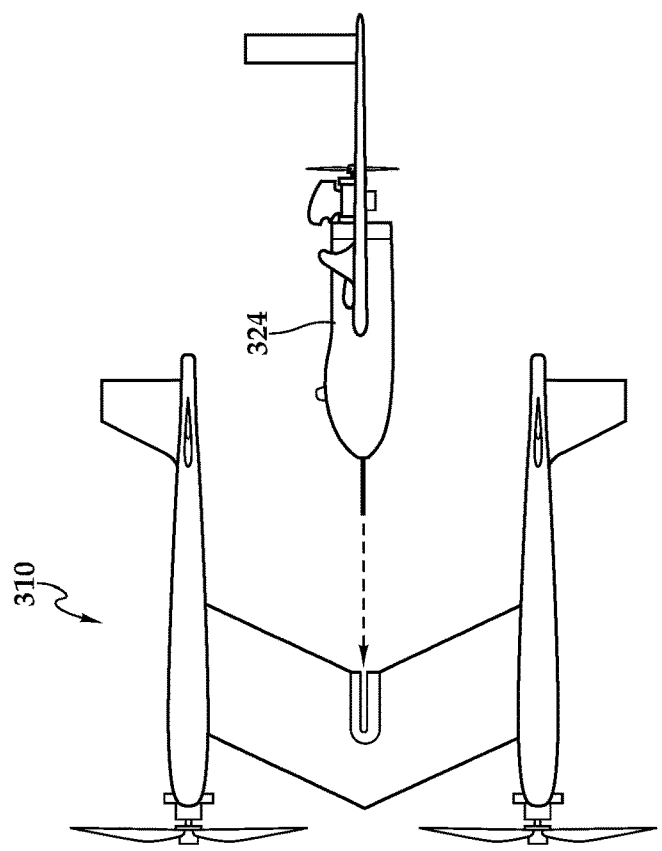
Figure 7D:
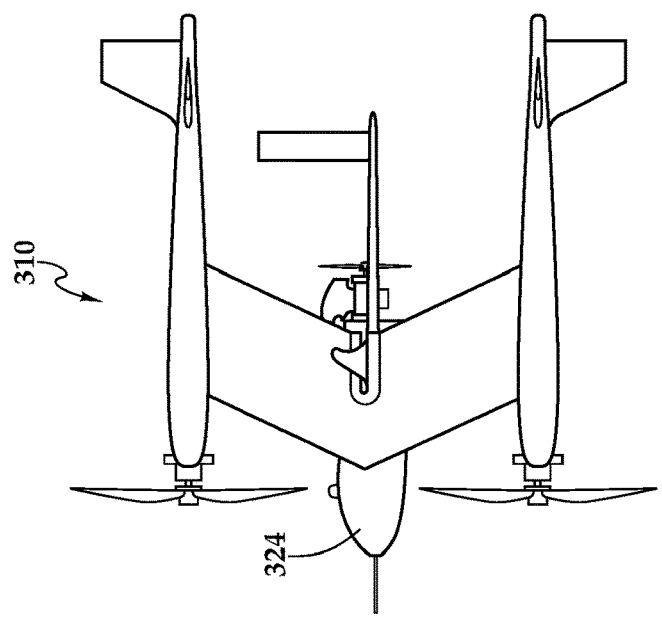

UAV 324 may be a multirole aircraft having a digital flight control and navigation system and the ability for swarm networking and cooperation. UAV 324 may have a sensor system that includes a sensor array having one or more of an optical camera, a thermal camera, an infrared camera, a video camera, an intelligence, surveillance and reconnaissance module and/or other desired sensors. As best seen from the progression of FIGS. 7A-7B, when aircraft 310 reaches the desired release location, the flight control system provides the launch commands for release UAV 324. In the illustrated embodiment, UAV 324 is released aftward from aircraft 310 as indicated by the launch arrow in FIG. 7B. Following release, UAV 324 performs its intended missions independent of aircraft 310. Aircraft 310 may loiter in the air or execute a landing operation while UAV 324 performs its missions. Upon completion of its mission, UAV 324 may reconnect with aircraft 310, as best seen from the progression of FIGS. 7C-7D and as indicated by the recovery arrow in FIG. 7C. Thereafter, aircraft 310 may transport UAV 324 to another location for another UAV mission or back to the original takeoff location or other suitable location where aircraft 310 may make a vertical landing together with UAV 324.

Figure 8:
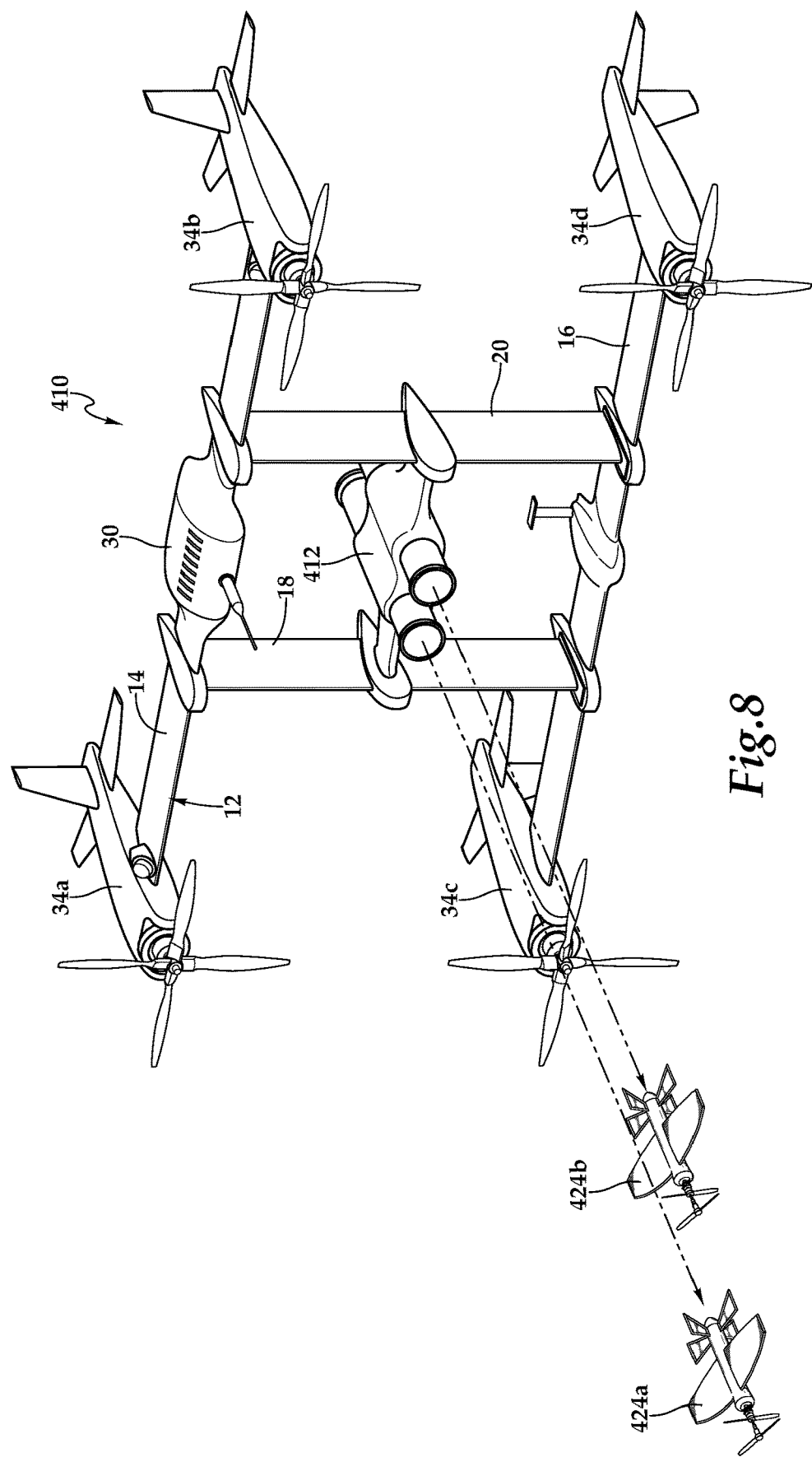
FIG. 8 is a schematic illustration of an aircraft for transporting and deploying UAVs that is operable to convert between thrust-borne lift in a VTOL orientation and wing-borne lift in a biplane orientation in accordance with embodiments of the present disclosure.

Referring next to FIG. 8 in the drawings, an aircraft 410 is operable to transition between thrust-borne lift in a VTOL orientation and wing-borne lift in a biplane orientation and is substantially similar to aircraft 10 except that aircraft 410 includes a UAV carrier assembly in the form of a tube launcher 412. As illustrated, tube launcher 412 is configured to receive, secure, transport and deploy two UAVs 424a, 424b. In the illustrated embodiment, UAVs 424a, 424b are horizontally stacked when aircraft 410 is in the biplane orientation. Tube launcher 412 is configured to launch UAVs 424a, 424b forward of aircraft 410 as indicated by the launch arrows in FIG. 8, when aircraft 412 is in the biplane orientation. Tube launcher 412 may be configured to launch UAVs 424a, 424b either sequentially, as illustrated, or simultaneously.

Referring next to FIG. 9 in the drawings, an aircraft 510 is operable to transition between thrust-borne lift in a VTOL orientation and wing-borne lift in a biplane orientation and is substantially similar to aircraft 10 except that aircraft 510 includes a UAV carrier assembly in the form of a tube launcher 512. As illustrated, tube launcher 512 is configured to receive, secure, transport and deploy two UAVs 524a, 524b. In the illustrated embodiment, UAVs 524a, 524b are horizontally stacked when aircraft 510 is in the biplane orientation. Tube launcher 512 is configured to launch UAVs 524a, 524b aftward of aircraft 510 as indicated by the launch arrows in FIG. 9, when aircraft 512 is in the biplane orientation. Tube launcher 512 may be configured to launch UAVs 524a, 524b either sequentially, as illustrated, or simultaneously.

Figure 10A:
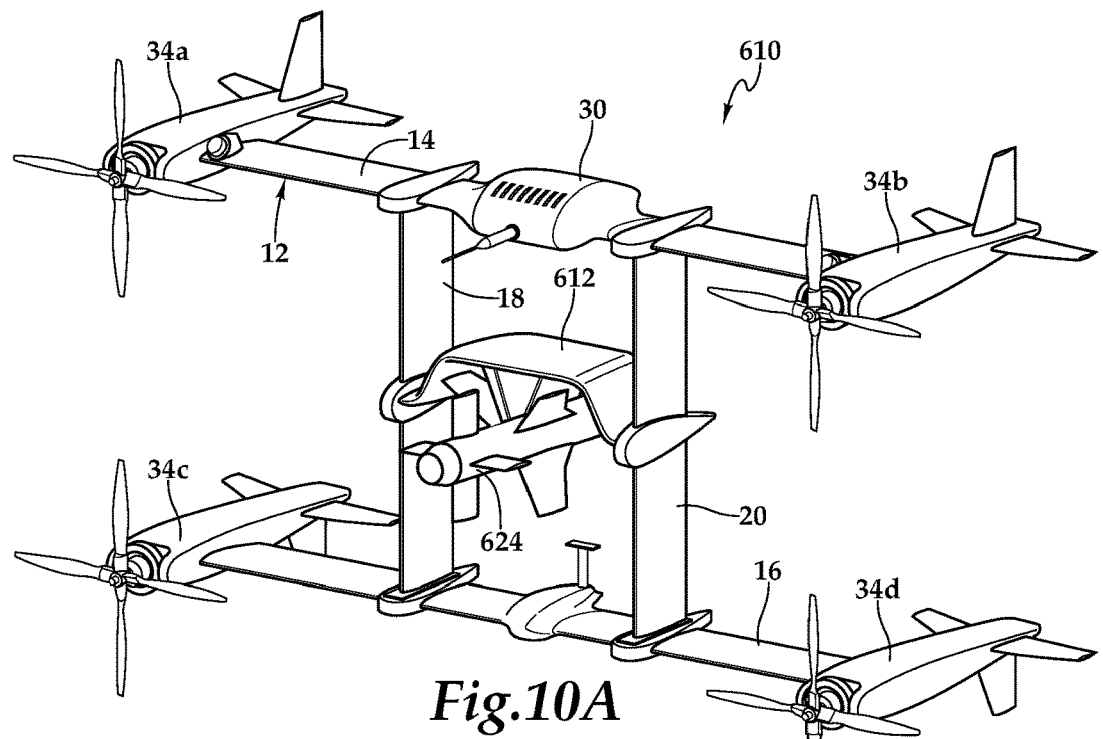
FIGS. 10A-10B are schematic illustrations of an aircraft for transporting and deploying UAVs that is operable to convert between thrust-borne lift in a VTOL orientation and wing-borne lift in a biplane orientation in accordance with embodiments of the present disclosure.
Figure 10B:
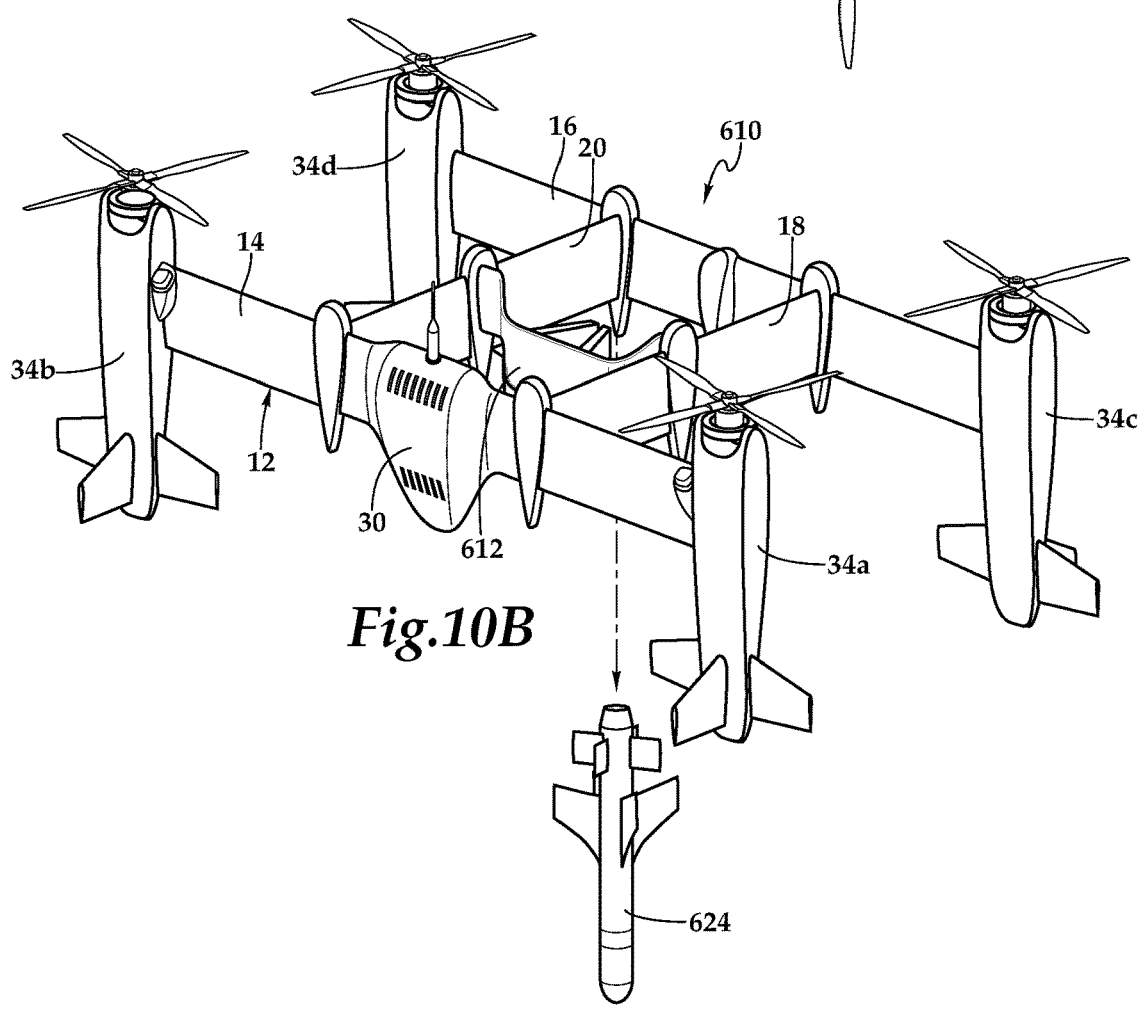

Referring next to FIGS. 10A-10B in the drawings, an aircraft 610 is operable to transition between thrust-borne lift in a VTOL orientation and wing-borne lift in a biplane orientation and is substantially similar to aircraft 10 except that aircraft 610 includes a UAV carrier assembly in the form of a munition harness 612. As illustrated, munition harness 612 is configured to receive, secure, transport and deploy a single UAV 624. Munition harness 612 is configured to launch UAV 624 downward from aircraft 610 as indicated by the launch arrow in FIG. 10B, when aircraft 612 is in the VTOL orientation.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft operable to transition between thrust-borne lift in a VTOL orientation and wing-borne lift in a biplane orientation, the aircraft comprising:
   an airframe including first and second wings with first and second pylons coupled therebetween;
   a distributed thrust array coupled to the airframe, the thrust array including a plurality of propulsion assemblies coupled to the first wing and a plurality of propulsion assemblies coupled to the second wing;
   a UAV carrier assembly coupled between the first and second pylons, the UAV carrier assembly having a plurality of UAV stations each configured to selectively transport and release a UAV, the UAV carrier assembly having a substantially horizontal cross member coupled between the first and second pylons, a first beam extending substantially vertically upward from the cross member and a second beam extending substantially vertically downward from the cross member when the aircraft is in the biplane orientation; and
   a flight control system configured to control each of the propulsion assemblies and launch each of the UAVs during flight.

2. The aircraft as recited in claim 1 wherein the plurality of UAV stations are vertically stacked when the aircraft is in the biplane orientation.

3. The aircraft as recited in claim 1 wherein the plurality of UAV stations further comprises at least three UAV stations.

4. The aircraft as recited in claim 1 wherein the plurality of UAV stations further comprises at least six UAV stations.

5. The aircraft as recited in claim 1 wherein each of the UAV stations is configured to provide a mechanical coupling with a respective one of the UAVs.

6. The aircraft as recited in claim 1 wherein each of the UAV stations is configured to provide a magnetic coupling with a respective one of the UAVs.

7. The aircraft as recited in claim 1 wherein each of the UAV stations is configured to provide an electrical coupling with a respective one of the UAVs.

8. The aircraft as recited in claim 1 wherein each of the UAV stations is configured to provide a power communication coupling with a respective one of the UAVs.

9. The aircraft as recited in claim 1 wherein each of the UAV stations is configured to provide a data communication coupling with a respective one of the UAVs.

10. The aircraft as recited in claim 1 wherein the flight control system is configured to sequentially launch each of the UAVs.

11. The aircraft as recited in claim 1 wherein the flight control system is configured to simultaneously launch each of the UAVs.

12. The aircraft as recited in claim 1 wherein the flight control system is configured to launch each of the UAVs when the aircraft is in the biplane orientation.

13. The aircraft as recited in claim 1 wherein each of the UAVs is released aftward from the aircraft.

14. The aircraft as recited in claim 1 wherein the first and second beams are aft swept beams.

15. An aircraft operable to transition between thrust-borne lift in a VTOL orientation and wing-borne lift in a biplane orientation, the aircraft comprising:
 an airframe including first and second wings with first and second pylons coupled therebetween;
 a distributed thrust array coupled to the airframe, the thrust array including a plurality of propulsion assemblies coupled to the first wing and a plurality of propulsion assemblies coupled to the second wing;
 a UAV carrier assembly coupled between the first and second pylons, the UAV carrier assembly having a plurality of UAV stations each configured to selectively transport and release a UAV, the UAV carrier assembly having a substantially horizontal cross member coupled between the first and second pylons, a first beam extending substantially vertically upward from the cross member and a second beam extending substantially vertically downward from the cross member when the aircraft is in the biplane orientation; and
 a flight control system configured to control each of the propulsion assemblies and launch each of the UAVs during flight;
 wherein, the flight control system is configured to sequentially launch each of the UAVs when the aircraft is in the biplane orientation; and
 wherein, each of the UAVs is released aftward from the aircraft.

* * * * *